US 7,885,243 B2

(12) United States Patent
da Costa et al.

(10) Patent No.: US 7,885,243 B2
(45) Date of Patent: Feb. 8, 2011

(54) HIGH PERFORMANCE WIRELESS NETWORKS USING DISTRIBUTED CONTROL

(75) Inventors: Francis da Costa, San Jose, CA (US); Sriram Dayanandan, San Jose, CA (US)

(73) Assignee: Mesh Dynamics, Inc., Santa Clara, CA (US)

( * ) Notice: Subject to any disclaimer, the term of this patent is extended or adjusted under 35 U.S.C. 154(b) by 382 days.

(21) Appl. No.: 12/154,155

(22) Filed: May 19, 2008

(65) Prior Publication Data

US 2009/0040989 A1  Feb. 12, 2009

Related U.S. Application Data

(63) Continuation of application No. 10/434,948, filed on May 8, 2003, now Pat. No. 7,420,952.

(60) Provisional application No. 60/421,930, filed on Oct. 28, 2002.

(51) Int. Cl.
*H04W 4/00* (2009.01)

(52) U.S. Cl. ............... 370/338; 370/319; 370/321; 370/328; 370/336; 370/442; 455/41.2; 455/41.3; 455/450; 455/502; 455/507

(58) Field of Classification Search ............ 455/41.2, 455/41.3, 450, 502, 507; 370/319, 321, 328, 370/338, 336, 442, 445

See application file for complete search history.

(56) References Cited

U.S. PATENT DOCUMENTS

| 6,799,045 B1 * | 9/2004 | Brouwer ............... 455/453 |
| 6,912,373 B2 * | 6/2005 | Lee ............... 455/41.2 |
| 2002/0159409 A1 * | 10/2002 | Wolfe et al. ............ 370/329 |

* cited by examiner

*Primary Examiner*—Stephen M D'Agosta
(74) *Attorney, Agent, or Firm*—Cherskov & Flaynik

(57) ABSTRACT

A design and proof of concept of a new type of WLAN, complete with simulation and results from the simulation has been described. Each AP Node is implemented as a self-contained embedded OS unit, with all algorithms resident in its Operating system. The normal day-to-day functioning of the AP node is based entirely on resident control algorithms. Upgrades are possible through a simple secure communications interface supported by the OS kernel for each AP node. Benefits provided by a wireless network, as proposed in this invention, are that: it installs out of the box; the network is self-configuring; the network is redundant in that mesh network formalism is supported, ensuring multiple paths; load balancing is supported; there is no single point of failure; allows for decentralized execution; there is a central control; it is network application aware; there is application awareness; there is automatic channel allocation to manage and curtail RF interference, maximize non interference bandwidth and enable seamless roaming between adjoining wireless sub networks (BSS) and it supports the wireless equivalent for switching—for seamless roaming requirements.

13 Claims, 24 Drawing Sheets

HIGH PERFORMANCE WIRELESS NETWORKS USING DISTRIBUTED CONTROL

CROSS-REFERENCE

This application is a continuation of U.S. patent application Ser. No. 10/434,948, entitled HIGH PERFORMANCE WIRELESS NETWORKS USING DISTRIBUTED CONTROL filed May 8, 2003, now U.S. Pat. No. 7,420,952 which is incorporated herein by reference for all purposes, which claims priority to U.S. Provisional Application No. 60/421,930, filed Oct. 28, 2002, which is herein incorporated by reference.

FIELD OF THE INVENTION

The present invention describes an adaptive software layer for a distributed set of wireless communication devices that communicate with each other in a wireless network. The software control layer addresses low latency requirements (for applications such as voice) and high throughput requirements (for applications involving data transfer). One embodiment of the present invention provides the software control for wireless (devices, such as, but not limited to Access Points, employed in a convergent enterprise network supporting voice, video and data. A topical application of the software control layer is a home or personal networking environment (PAN) using Ultra Wide Band or Wi-Fi as the communications medium. Another topical application of the adaptive software control layer is extending wireless communication range using mesh networks for Metropolitan Area Networks (MAN). Lastly, the software control layer is also relevant to both home and enterprise Wireless Local Area Networks (WLANS).

BACKGROUND OF THE INVENTION

There is increasing demand within the enterprise, the home and within cities to employ one wireless network to support both voice, video and data traffic. Currently, the "voice" network, e.g. the telephone system, is separate from the "data" network e.g. Internet connectivity and access to enterprise data over a Local Area Network (LAN). Convergence is, as the name implies, the ability to converge these two networks into one network, centrally managed by one access server servicing a network of relay and leaf nodes.

The challenge lies in providing—within the same wireless network—the ability to address potentially conflicting latency and throughput needs of diverse applications. For example, voice needs to be transmitted with low delay (latency). Occasionally lost voice packets, while undesirable, is not fatal for voice transmissions. Conversely, data transmissions mandate delivery of all packets and while low latency is desirable it is not essential. In essence transmission across the wireless network should ideally be driven by the needs of the application. The table below lists some types of applications and their latency requirements.

| Delivery Type | Description |
| --- | --- |
| Asynchronous | No constraints on delivery time ("elastic"): e.g. email |
| Synchronous | Data is time-sensitive, but requirements flexible in terms of delays |
| Interactive | Delays noticeable but not adversely affecting usability or functionality |
| Isochronous | Time-sensitive: delays adversely affect usability. E.g. voice/video |
| Mission critical | Data delivery delays disables functionality |

A wireless network provides service to a diverse set of applications, with varied latency requirements. One approach to make dumb wireless devices, that are nodes of the network, more application aware by implementing QoS (Quality of Service) reservation schemes dictated by the application server.

Changing the rate the queue is serviced can also be accomplished by specialized communications between wireless communication devices such as Access Point (AP) nodes and the access server to ensure that voice and data, for example, are serviced at different time intervals. Unfortunately, this adversely affects scalability and redundancy of the system: the access server is now micromanaging the network and has become a single point of failure. A paramount concern of any network is distributed control, especially a network handling voice, video and data.

Another shortcoming of a centralized approach—central control and central execution—is the cost of maintaining a central control point with all intelligence and control at one location and dumb communication devices distributed in the enterprise. The cost of the central control point is high, and the dumb access points are not any less expensive than smart access points—since the smarts is in the software. Thus a distributed approach is far less expensive—. In addition to being more cost effective a distributed approach is more fault tolerant and has built in fail-safe redundancy. The only way to get redundancy out of centralized approaches is to buy multiple central control points—an expensive approach.

Building a reliable wireless network comes with other constraints specific to wireless. Some routing paths may be best for voice and video, others for data. In Ethernet applications separate routing paths is easily accomplished. But in a wireless network, operating over radio, the cost of associating and disassociating with a relay node—to switch to new routing paths—is prohibitive. Multiple radios, supporting separate voice and data channels is possible but expensive. It is preferable, therefore, if each AP node can support both voice and data transmissions with a one "channel".

SUMMARY OF THE INVENTION

Accordingly, there is a need for, and an objective of the present invention, to develop an adaptive wireless network, based on "smart" communication devices such as Access Points (AP) that provide embedded intelligence at the edge of the network, are application aware and provide cost effective distributed sensing and control of the network. An additional objective of this invention is to allow the characteristics of the network to be set by a centralized access server, which can thus "tune" the character of the network to be anything between the two extremes of low latency to high throughput, based on the needs of applications running in the enterprise. The invention also supports the possibility of running multiple types of networks supporting anything between the two extremes of low latency and high throughput, using multiple radios at each node for each distinct type of network.

As an illustration of central control but distributed intelligence, consider FIG. 1, where the star network depicted has low latency (See FIG. 1B for the latency in the status panel). However, since the signal strength varies inversely with the distance from the Access Point, as shown in FIG. 1A in the look up table (control panel) on the top left corner, the price is poor throughput. If all devices are required to connect directly to the root node as shown, regardless of their distance from the root node, then the overall throughput of the network can be low.

Since the signal strength varies inversely with the distance, it may be advantageous, from the perspective of better signal strength and overall better throughput for some AP nodes to connect to an intermediate AP rather than to the root, as shown in FIG. 2C. In FIG. 2, the throughput of the network has increased, see FIG. 2B, because two nodes are connecting to other nodes (relays) with an overall increased throughput from 44.1 to 62.2. (See FIGS. 1B and 2B).

The number 44.1 is a measure of the throughput computed based on the look up table shown in FIGS. 1 and 2 where distance from the root causes a rapid decrease in throughput. The throughput is expressed as a percentage, where a connection to the root at zero distance would be the maximum possible throughput: 100%.

While the throughput increased to 62.2, the tradeoff is more hops, resulting in a loss of latency for higher throughput. In FIG. 2, the latency has increased as a measure of the number of hops from an Access Point (AP) to the root node. It is 1.6, since some nodes now are 2 hops away from the root node.

The objective of this invention is to allow the Access Server to set some latency/throughput constraints that causes each AP node to change their relationships to each other and consequently the character of the network. Control parameters, set by an access server can then tune the wireless network to provide a mix between the two extremes of max throughput and low latency. As shown in FIG. 3, parameters set by the access server cause the network to self configure providing an average latency to 1.3 from 1.6. (See FIGS. 3B and 2B). Even though the throughput has reduced from 62.2 to 57.0%, it is still better than 44.1, the case in FIG. 1.

The approach taken to modify the network is completely decentralized—the changes in the network take place with algorithms running in each AP node. The Access Server does not change the characteristics of each node, it simply sets the parameters governing the characteristic of the network—and let the AP nodes reconfigure their relationships to meet the objectives set by the Access Server. Thus the Access Server can control the behavior of the network without necessarily controlling the behavior of each node of the network. Benefits of this approach include a highly scaleable, redundant wireless network. Some other benefits include:

1. Installs out of the box. No site survey or installation involved, since system self configures
2. Network is redundant. Mesh network formalism is supported, ensuring multiple paths.
3. Load balancing supported: Network nodes reroute data to avoid load-congested nodes.
4. No single point of failure. If a node "dies", another optimal routing path is selected
5. Decentralized execution: Algorithms controlling the network nodes resident in every node.
6. Central control: Setting system level "tuning" parameters changes network configuration
7. Network application aware: latency/throughput profiles defined in the access server
8. Application awareness: Based on the application profile in the access server, the network configures itself to satisfy all application requirements as best as possible.
9. Network is very scaleable—since execution is completely decentralized Uses of a self configuring application aware wireless network range from providing voice/data access to warehouses, factory floors, communications with process control equipment to home networking applications involving voice/data/video streaming. Some applications under consideration include:

Monitoring process control equipment with a Publish/Subscribe Stream server built on top of the wireless network. Examples include chemical plants, medical devices, industrial controls.

Voice over IP (VOIP) based low cost communication devices for mobility within enterprises Video streaming over wireless for remote surveillance.

These and other embodiments of the present invention are further made apparent, in the remainder of the present document, to those of ordinary skill in the art.

BRIEF DESCRIPTION OF DRAWINGS

In order to more fully describe embodiments of the present invention, reference is made to the accompanying drawings. These drawings are not to be considered limitations in the scope of the invention, but are merely illustrative.

FIG. 1A illustrates the control panel; FIG. 1B illustrates the status panel and FIG. 1C illustrates the wireless network.

FIG. 2A illustrates the control panel; FIG. 2B illustrates the status panel and FIG. 2C illustrates the wireless network.

FIG. 3A illustrates the control panel; FIG. 3B illustrates the status panel and FIG. 3C illustrates the wireless network.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

The object of this invention is a new type of wireless AP nodes that:

Configure them selves based on considerations, set by the access server for the network.

Support automatic load balancing: AP nodes avoid data congestion hot spots.

Support fail over: if one node dies, nodes connected to it automatically switch to another.

Is fully functional when powered up: no installation procedure or site survey required.

Support software upgrades to them selves through a communications interface

Support both isochronous and asynchronous application requirements in the same network Support the wireless equivalent of switches Supports centralized control and is application aware based on settings provided by the access server.

Each AP Node is implemented as a self-contained embedded system, with all algorithms resident in its operating system. The normal day-to-day functioning of the AP node is based entirely on resident control algorithms. Upgrades are possible through a communications interface described later.

Description of System Components

Figure 1:
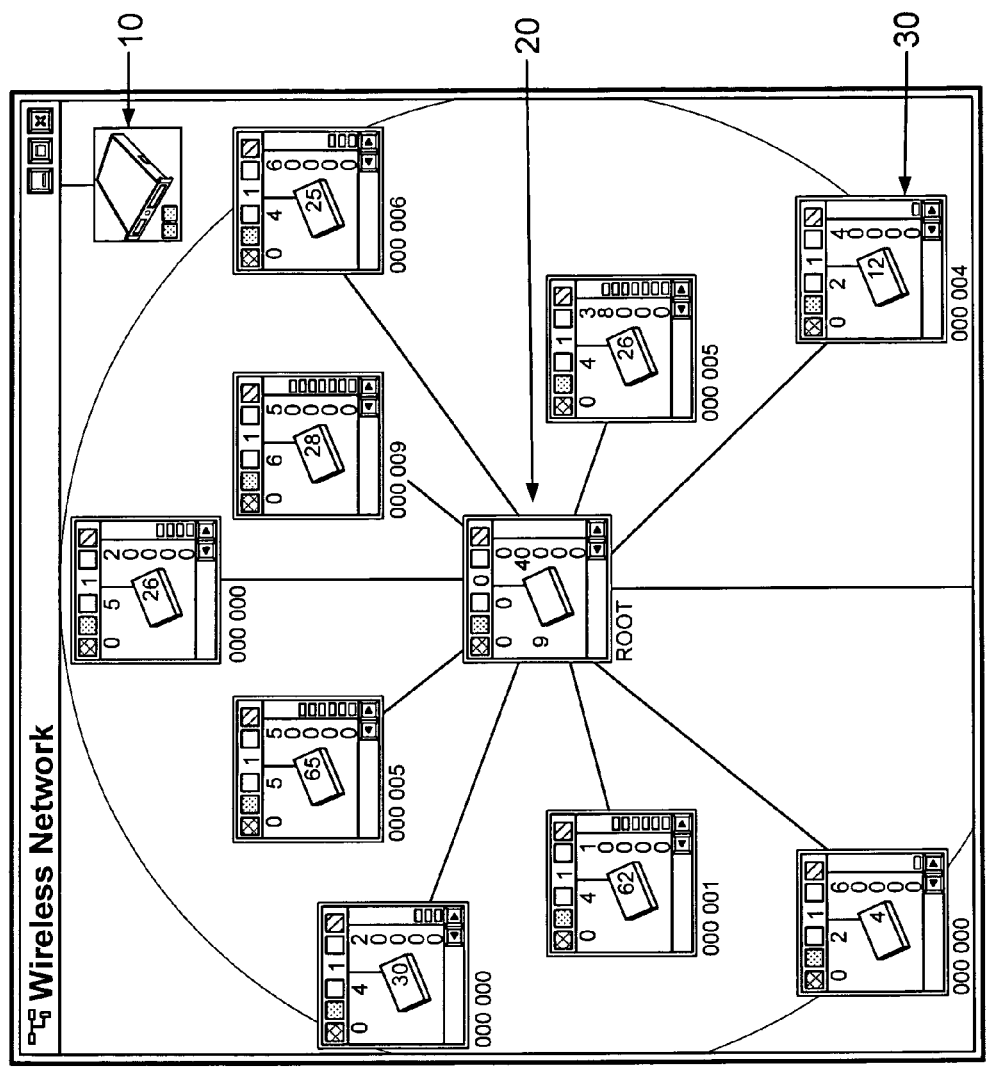
FIG. 1 illustrates a wireless network in star configuration, with low latency but poor throughput according to an embodiment of the present invention.
Figure 1:
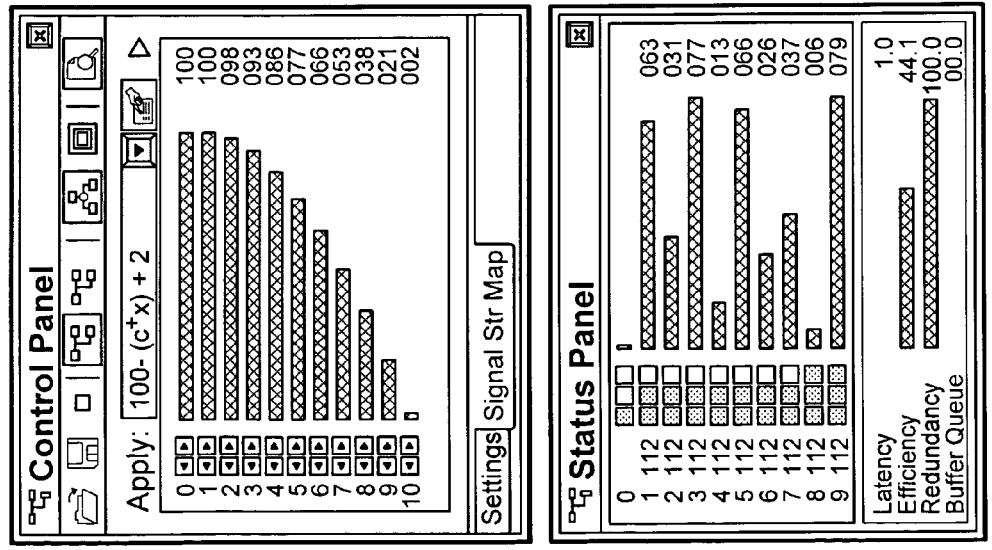

There are three typical components of the system proposed. In FIG. 1:

1. The Access server (10) "manages" the network, by setting control parameters for the network 2. The "Root" Node (20), is connected to the Access Server through an Ethernet link 3. Wireless communication Devices such as AP nodes (30) that connect to the Root or other AP nodes devices to form a communications path terminating at an Ethernet link.

To enable voice and data types of requirements to be serviced satisfactorily within the same network configuration, the access server (10) maintains a list of applications and their latency and throughput requirements. Based on those application "profiles", the access server (10) sets the Network "profile" that each wireless communication device (30) in the network strives towards.

In one implementation of the invention, the root node (20) acts as the interface between the wireless communication devices (30) and the Ethernet. All wireless devices (30) communicate to the Ethernet through a root node (20), which is has a radio interface and an Ethernet link.

In that implementation of the invention, other wireless communications devices or AP nodes (30) have two radios: one to communicate with its clients which includes wireless devices such as laptops, VOIP wireless phones etc. Clients to one AP node (30) also include other AP nodes (30) connecting to it. In FIG. 6(1), for example, Node 002 has nodes 005 connected to it. In addition all nodes (30) may have local clients—laptops etc.—connected to them directly. Each node, therefore, is dual purpose: It acts as a relay node—relaying traffic from a (child) node and also acts as an Access Point to local devices. In this implementation of the invention, redundancy is assured because of the mesh characteristic of the network.

In an alternate implementation of the invention, all Wireless AP Nodes are roots—they are all wired. In this case the network is not a mesh network and redundancy is dependant on having a large number of nearby AP nodes. However there is still communication between the nodes so load balancing and wireless switching, as described later, is supported.

Description of Variables Used by Algorithm

Figure 4:
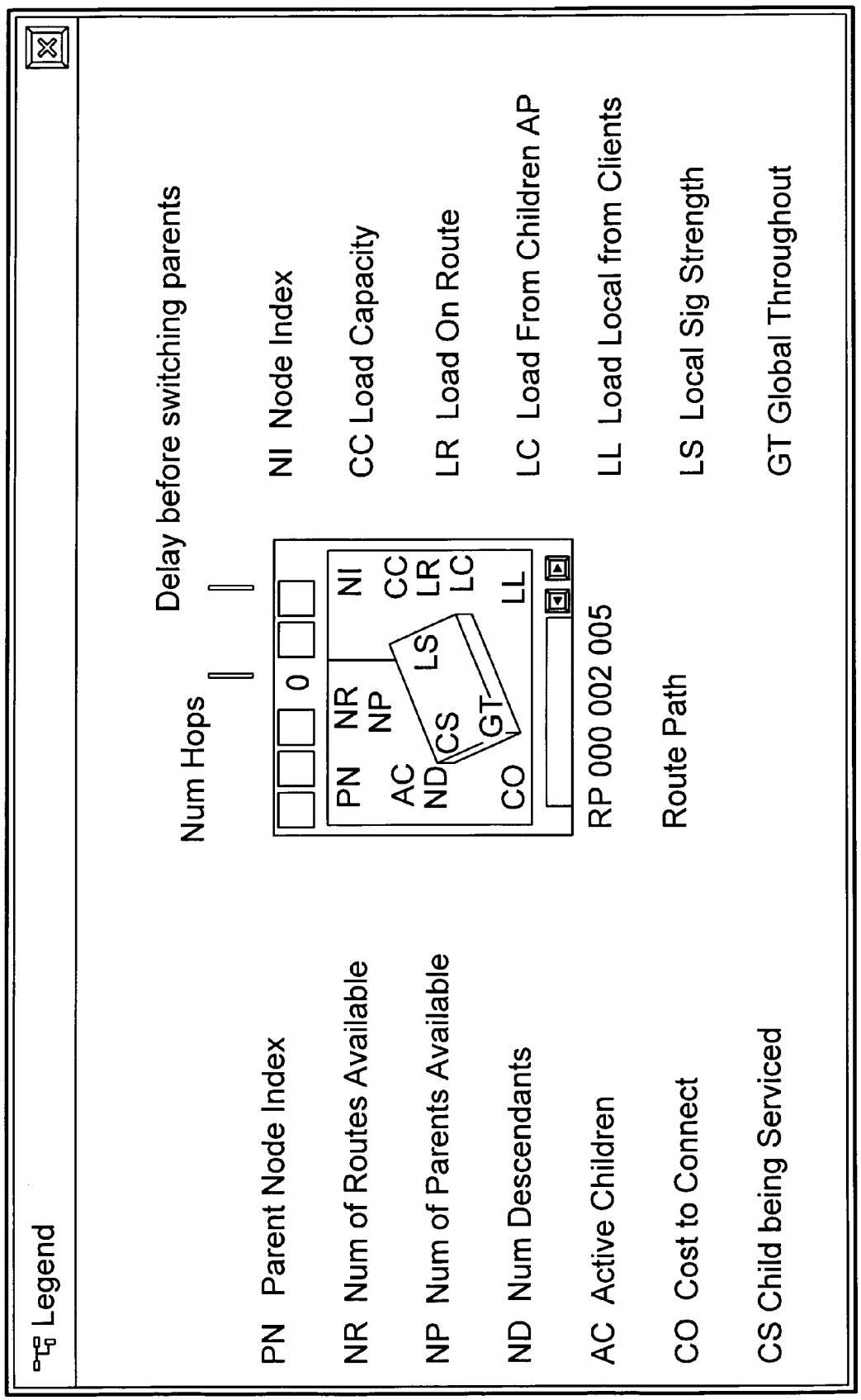
FIG. 4 indicates terminology for variables used by parent selection and load balancing algorithms according to an embodiment of the present invention.
Figure 5:
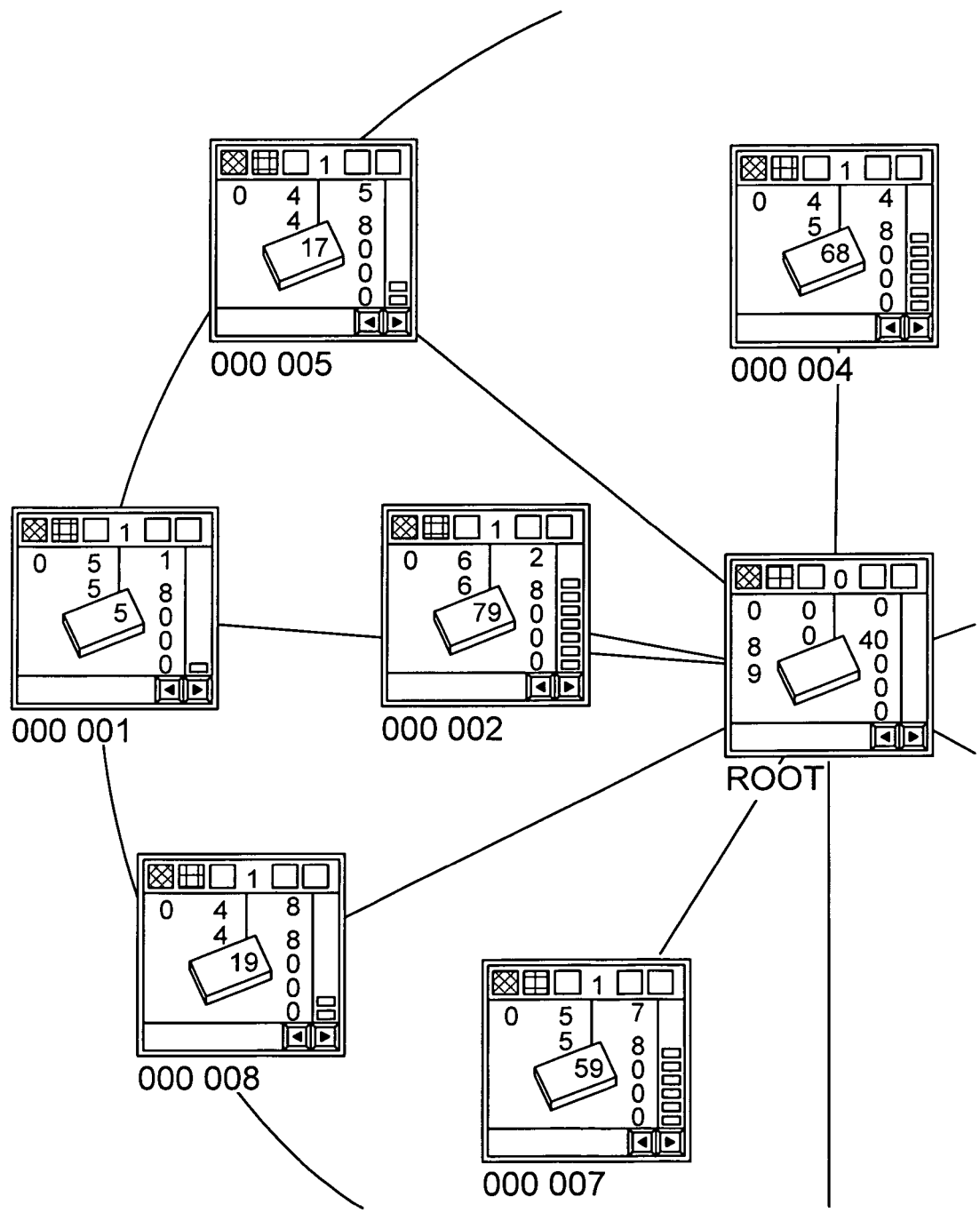
FIG. 5 illustrates Routing paths selected for low latency according to an embodiment of the present invention.
Figure 6A:
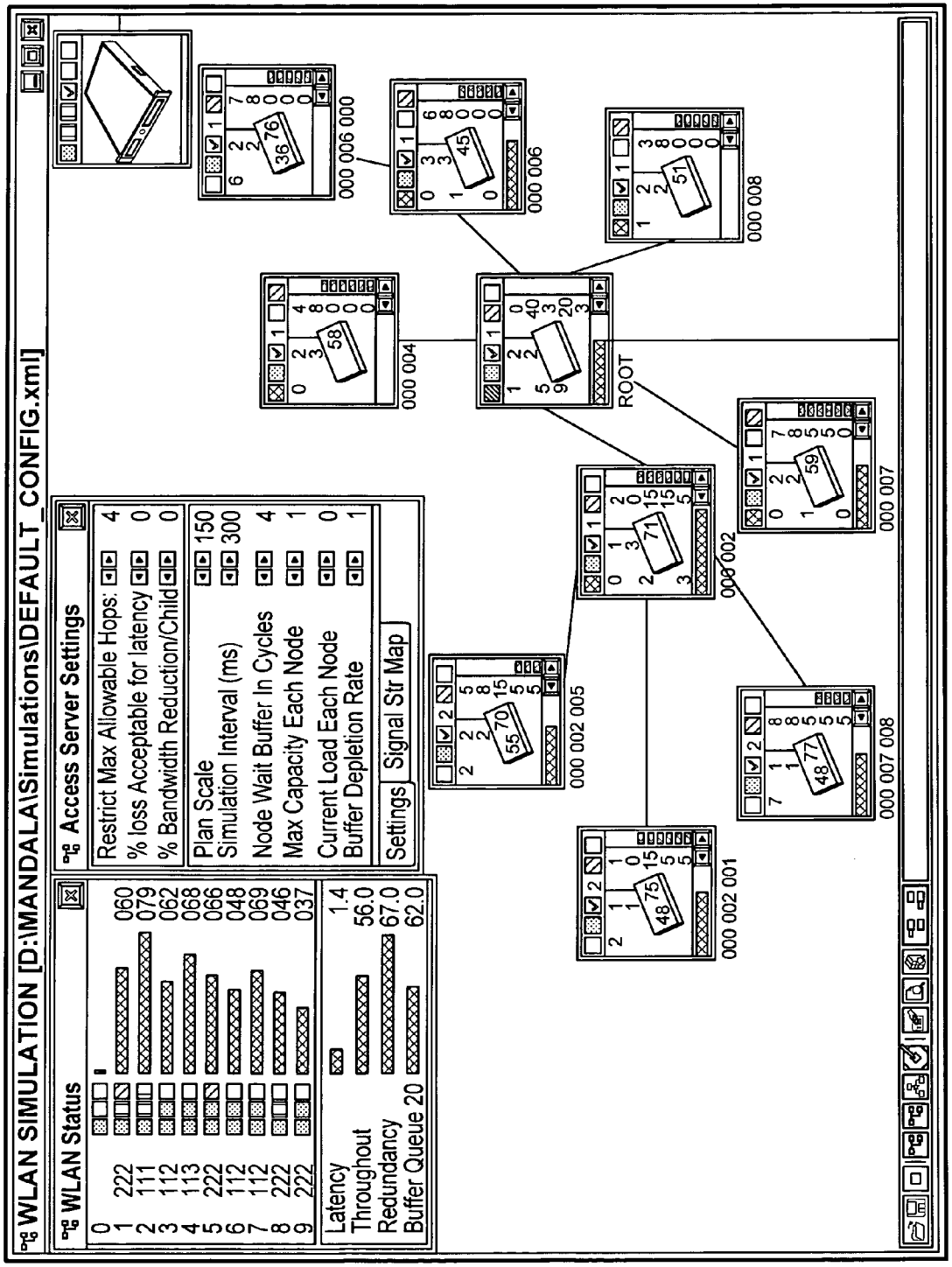
FIG. 6 illustrates how progressively changing the latency cost factor affects the network configuration according to an embodiment of the present invention.
Figure 6B:
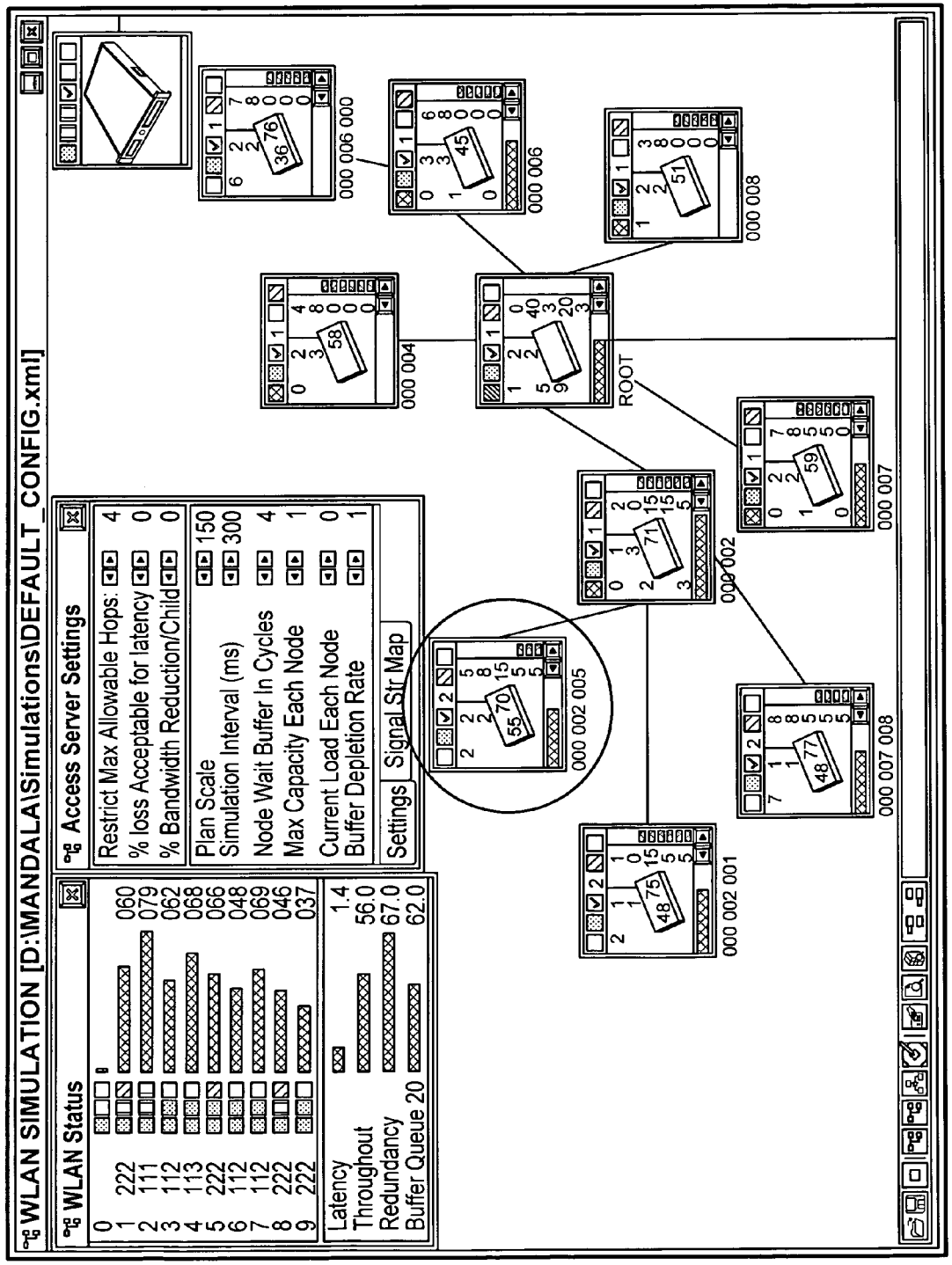
Figure 6C:
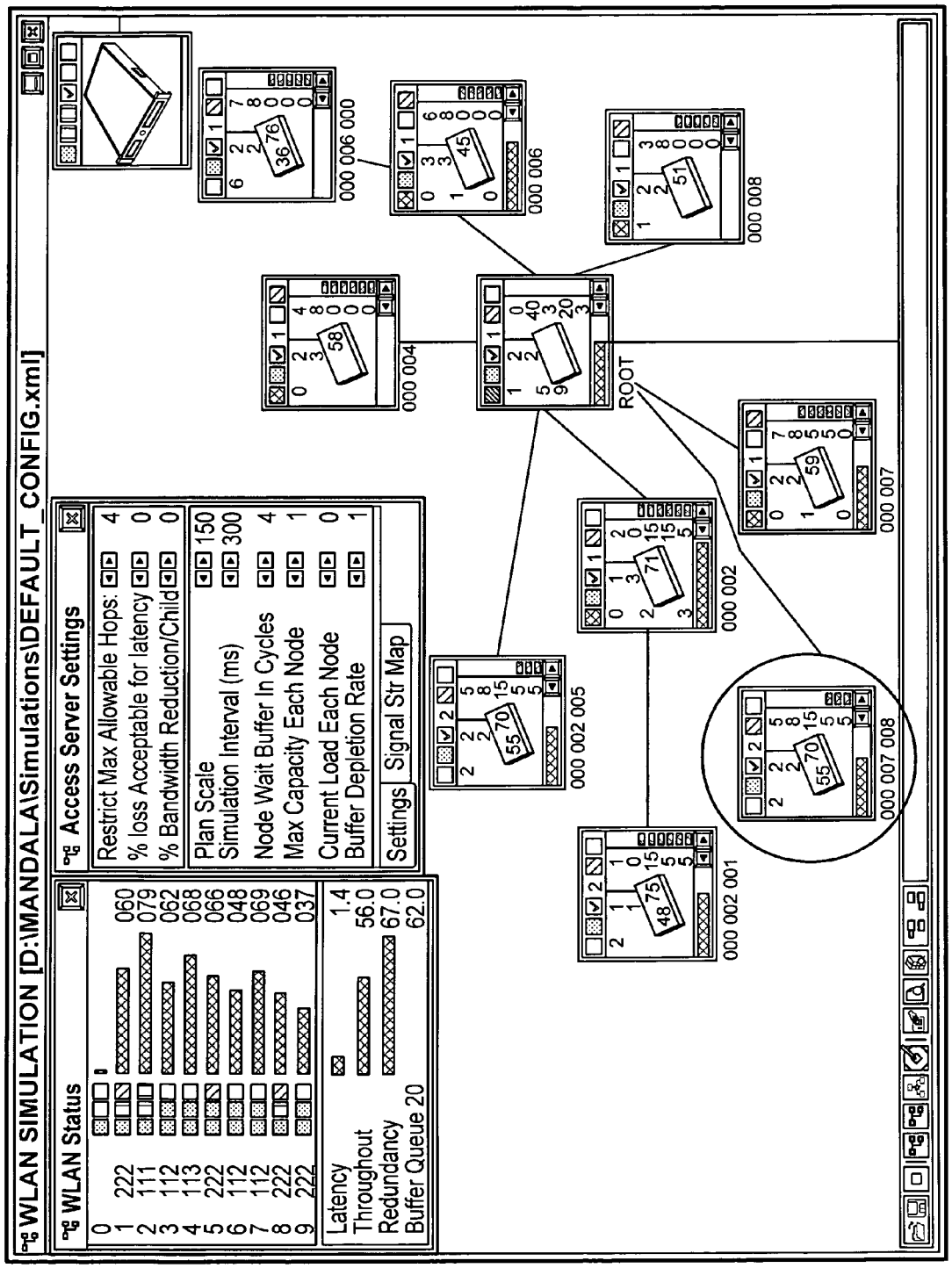
Figure 6D:
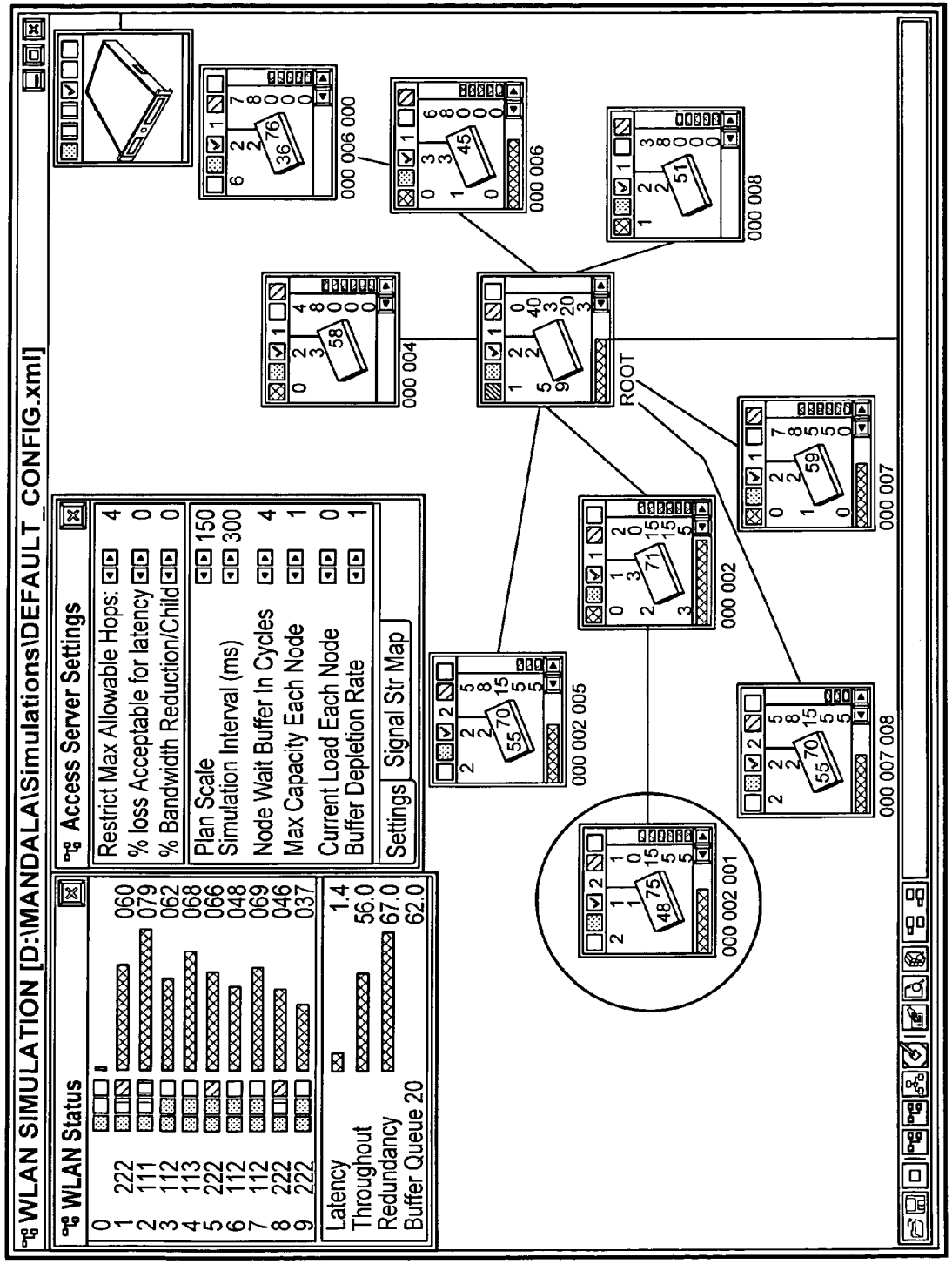

FIGS. 4-6 describe the variables used by the algorithms. With reference to FIG. 4, some relevant variables are:

NI: Node Index: the unique Identifier for each wireless communication node

PN: Parent Node Index: Node Index for a node connects to in order to transmit data, For example, In FIG. 6(1), the parent of Node 005 is 002.

RP: Route Path. In FIG. 6(1), the route path for 005 is 000 002 005, its connection route.

NP: Number of parents available: Each Node has choices regarding which parent it selects to connect to, based on latency/throughput requirements. In FIG. 6(1), Node 005 can connect to 004, 001, 002, and 000 (the root), all of whom are within the wireless range.

NR: Number of unique paths some of the parents may be children of another node in the list of NP. NR is therefore the list of unique roots the node has. In FIG. 6(1), 001 is a child of 005. The number of unique roots is therefore 3.

AC: Number of Active children. This is the number of immediate children a node has:

ND: Number of Descendants: Child nodes may also have their own children. ND is the total number of descendants that are connected, directly or indirectly to the parent node.

CO: Cost to connect. When a node is congested it raises the cost of connectivity for a prospective child, thereby dissuading new connections till the congestion is alleviated. The cost to connect is a number transmitted to the child node. It is related to the level of congestion LR: Load on Route, is the total communications traffic (load) from all children and their descendants that a Node sees. Thus in FIG. 6(1), the LR for Root Node 000 will be all nodes connected to it, directly on indirectly. This information is needed to determine if a particular parent can support the communication needs (load) of a new child node CC Load Capacity is the amount of communication traffic or load that the node is capable of handling. It will be driven by the buffer size of the node—since data from a node's children is typically buffered before being retransmitted to the node's parent.

LC Load from Children: This is the sum total of all traffic being passed on from children to their parent for retransmission to the parent's parent. In FIG. 6(1) Node 002 has load from children 005, 001, 008. Each of those nodes may have children with their loads.

LL Local Load: In addition to servicing children, each node may also be servicing individual clients that comprise their local load. For example, Node 002 services three child nodes. But in addition, there could be laptops in its vicinity that connect to it directly. They constitute a local load.

Figure 2:
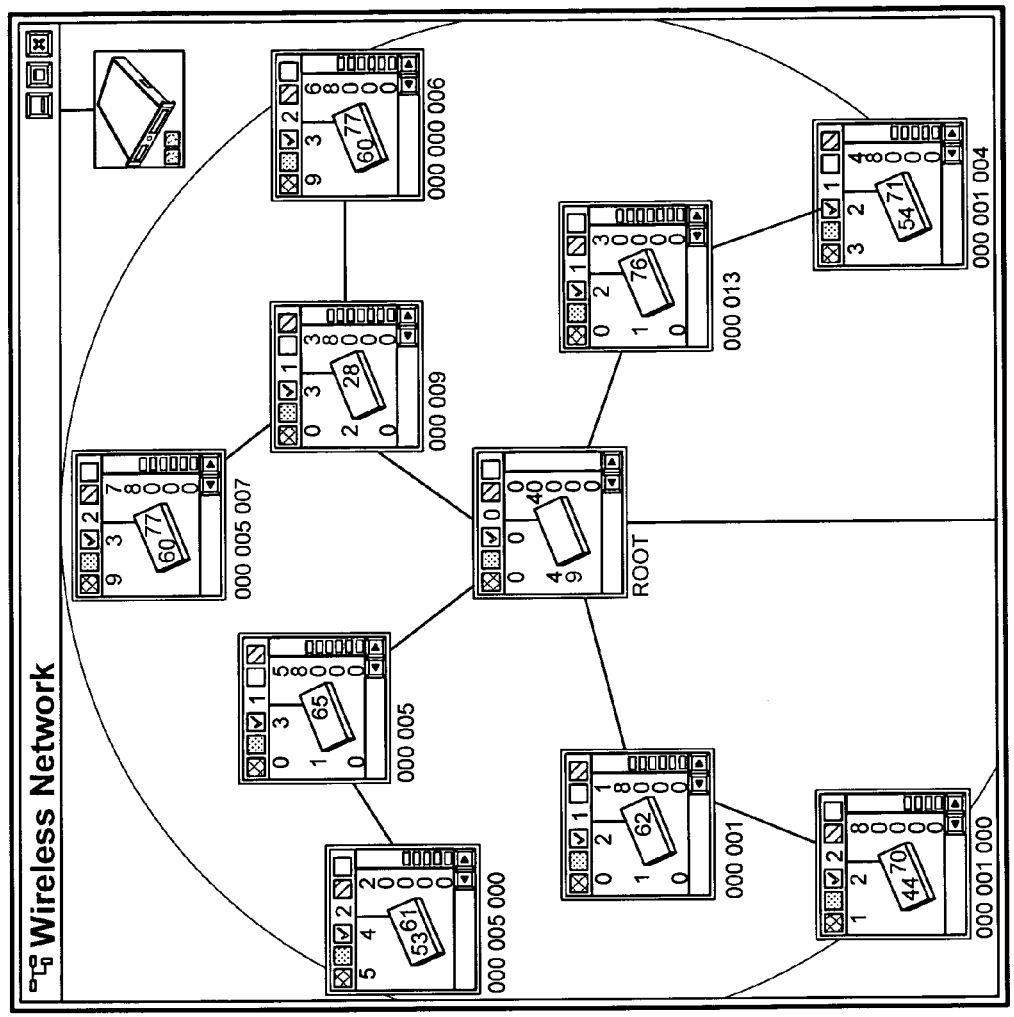
FIG. 2 illustrates a wireless network with improved throughput but poor latency according to an embodiment of the present invention.
Figure 2:
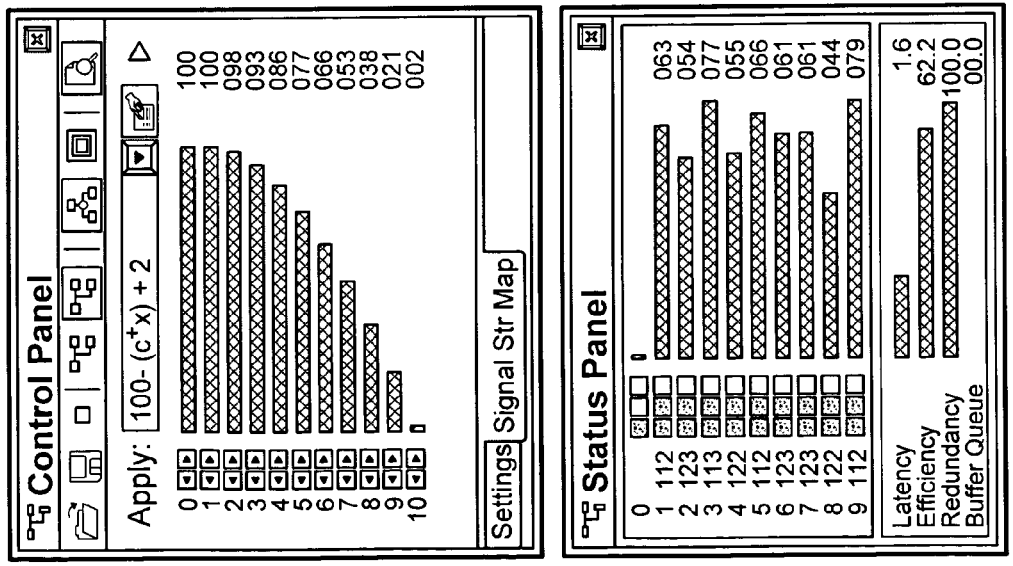

LS Local Signal Strength: is related to signal strength that a node sees from its parent. It is actually the throughput expected based on the actual signal strength seen by the radio and is computed based on a look up table as shown in FIGS. 1 and 2.

GT Global Throughput: This is the product of all throughputs each node along the route provides. Nodes connected to the root have a throughput related to LS. Thus the throughput of Node 002 in FIG. 6(1) is 79%, based on the throughput table shown in FIGS. 1 and 2 and its distance from the root.

The Global Throughput of Node 005 is (LS to Node 002)* (GT of Node 002)=0.79*70=0.55

Description of Parent Selection Algorithm

Since there is no central point of control in a distributed system, the same algorithms, running in every node, must determine what is best, based on the information it received from the Access Server and other nearby nodes. Much of this relates to selecting correct "route" or path to the root node. As an illustration, in FIG. 6(1) the route for Node 005 is 000-002-005. The Node 002 is, the parent for Node 005 while Node 000 is the parent for 002.

Assuming for the present, that the Access Server wishes the network to have the maximum throughput. Then, if each node independently makes the best selection of its parent—to maximize throughput—then a question arises of whether one can be assured that the network as a whole is running as "best" as possible.

To answer this, consider the network in FIG. 6(1). If the parameter set by the Access Server is to maximize throughput. Node 002 would examine all nodes it can connect to and choose a parent that ensures the highest global throughput (GT).

Since GT is product function of the LS times the GT of the potential node. Node 005 would have examined all potential parent nodes before selecting node 002. Similarly Node 002 has chosen Node 000. Other nodes would yield a lower GT. Thus, since each node is making a parent selection based on the "best" throughput, the throughput of the network as a whole is also maximized.

Thus, each node, starting from those closest to the root and spreading outwards maximizes its GT based on products related to the GT at each previous node, the overall throughput of the system is the sum of all individual throughputs, which have been maximized by the selection algorithm.

The implementation steps taken by the selection algorithm are:

1. Seek out and list all active nearby nodes.
2. Remove descendants: nodes that are connected to it, or children of nodes connected to it.
3. Order the list: push nodes closer to the route (shorter routing paths) up in the list.
4. Compute total throughput for each routing in the list of connection nodes
5. Select the node that provides the best latency or max throughput or combination of both.
6. Repeat steps 1,5 on a periodic basis.

To compute throughput, Nodes receive the following pieces of information from all nearby nodes:

1) The current routing path of the node. This is a list of nodes that the AP node has to connect to, in order to reach a root node. In FIG. 6(1), Node 005 has a routing path of 000-002-005.
2) The current throughput of that node. The signal strength of that node's parent as seen by the node, is correlated to a look up table that maps the signal strength to throughput. For Node 002 (FIG. 6(1)), that is shown as 79.

Based on these two pieces of information, collected for all nearby AP nodes, the node selects one parent node that satisfies the requirements of low latency or high throughput. If low latency is the issue then a short routing path is desirable: In FIG. 5 Node 005 chooses the root node 000. Note that the overall throughput for Node 005 is low—17% because of the large distance away from the root node, resulting in poor signal strength. Conversely, if high throughput were required, Node 005 would connect to Node 002. The overall throughput for that connection is:

Throughput (Node 002-Node 000) * Throughput (Node 005-Node 002):

$$0.79 * 0.70 = .55.$$

At the end of step 4, the global throughput—computed as a product of the local signal strength to that potential parent node and the GT of the potential parent node—is computed and compared for each potential parent in the list of nearby nodes. The one with the highest throughput wins.

Controlling Network Latency/Throughput

Figure 3:
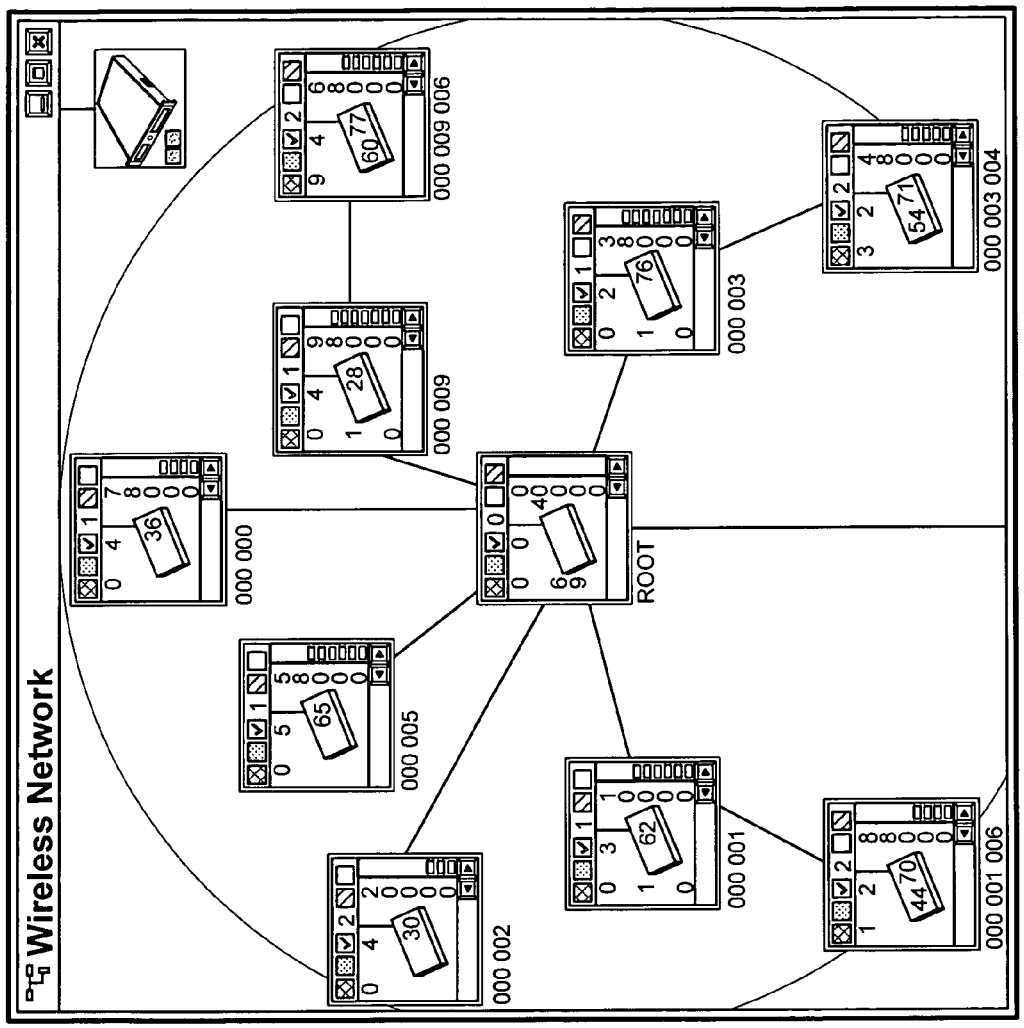
FIG. 3 shows the result of how wireless network self configures to meet Access Server requirements according to an embodiment of the present invention.
Figure 3:
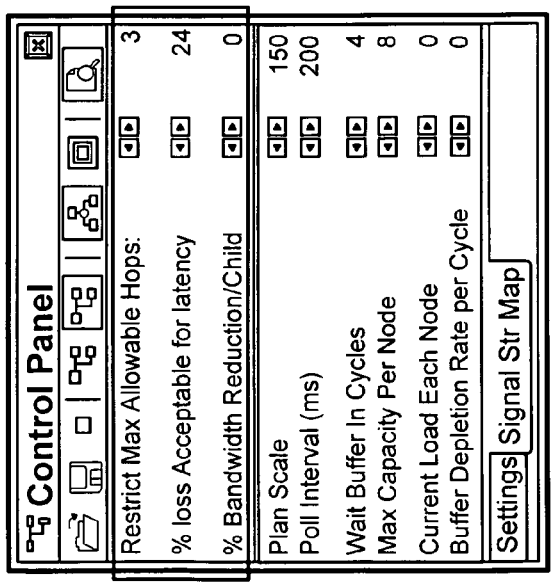
Figure 3:
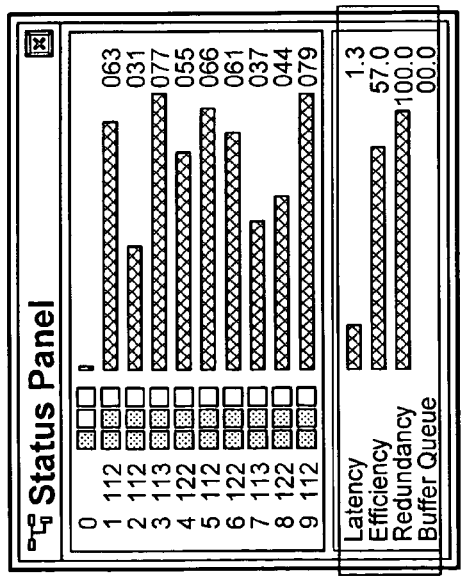

The section on the selection of the parent assumed that only maximizing throughput was the sole objective. Often there is a tradeoff between low latency and high throughput as evidenced in FIGS. 1, 2, and 3. Since each AP node is in all likelihood supporting multiple applications with diverse needs, the access server setting is probably not either extreme but something between low latency and max throughput.

The aforementioned describes the algorithm for maximized throughput. For lowest latency, the choice of parent is restricted to the parent with the highest throughput with an upper bound on the number of hops the parent is away from the root. There are two ways in which the Access Server can control the latency of the network:

1. Place an upper bound on the number of hops admissible for any node—this forces nodes on the fringe of the network to choose shorter path routes. This approach acts a cut off: it forces nodes at the fringe of the network towards selecting low latency routes, regardless of the loss in throughput. In terms of the routing algorithm, this translates to computing the throughput for selecting a parent with the highest throughput that fall in a group with latency better or equal to the upper bound.

2. Define a latency loss threshold whereby selecting a longer route path requires throughput gain to more than offset the loss of latency:

Throughput (Longer Route)+
Latency_loss_threshold>Throughput (Shorter route)

If the latency loss threshold is set high, the choices a node in selecting its parent is restricted, to nodes closer to the root, with shorter route paths. In contrast to the cutoff approach this approach is more forgiving: Selecting a longer path is allowed if throughput gains in choosing a longer routing path offset increased latency. In terms of the routing algorithm, this translates to computing the throughput for all nearby nodes.

Reference is now made to re-examining the parent selection process with latency restrictions in place. With reference to FIG. 6(1), if the latency restriction of the first type is enforced, and the maximum number of hops allowed for any node is set to 1, then the list of accessible nodes is reduced to node 000. Alternatively, or in conjunction with this restriction, if the latency threshold is set high, then even if other nodes are acceptable potential parents, the latency threshold will reduce their attractiveness and again Node 000 could be selected.

Combinations of both restrictions, based on the parameters set, result in networks that address both latency and throughput requirements. This was shown in FIG. 3, where the overall network configuration was somewhat mid way the two extremes. It is further evidenced in FIG. 6, where increasing the latency loss threshold results in progressively lower latency network configurations. Nodes circled in each snap shot of the simulation show movement towards shorter routing paths as the latency cost factor is progressively increased.

Automatic Load Balancing

Described thus far is how the parent selection process takes into account latency/throughput criteria set by the access server. However, one must also take into account how the system behaves under load, when the load increases at one node, causing congestion.

Since this is a distributed system, each node is responsible for selecting a parent that can service it satisfactorily—it is not part of a congested route. During the selection process, the connect cost associated with selecting a new parent is supplied by the parent. Thus a congested route will have a higher connect cost than a less congested route—and a lower throughput. The routing algorithm selects the parent with the highest throughput. As its connect cost increases a congested parent is increasing less attractive.

Figure 7:
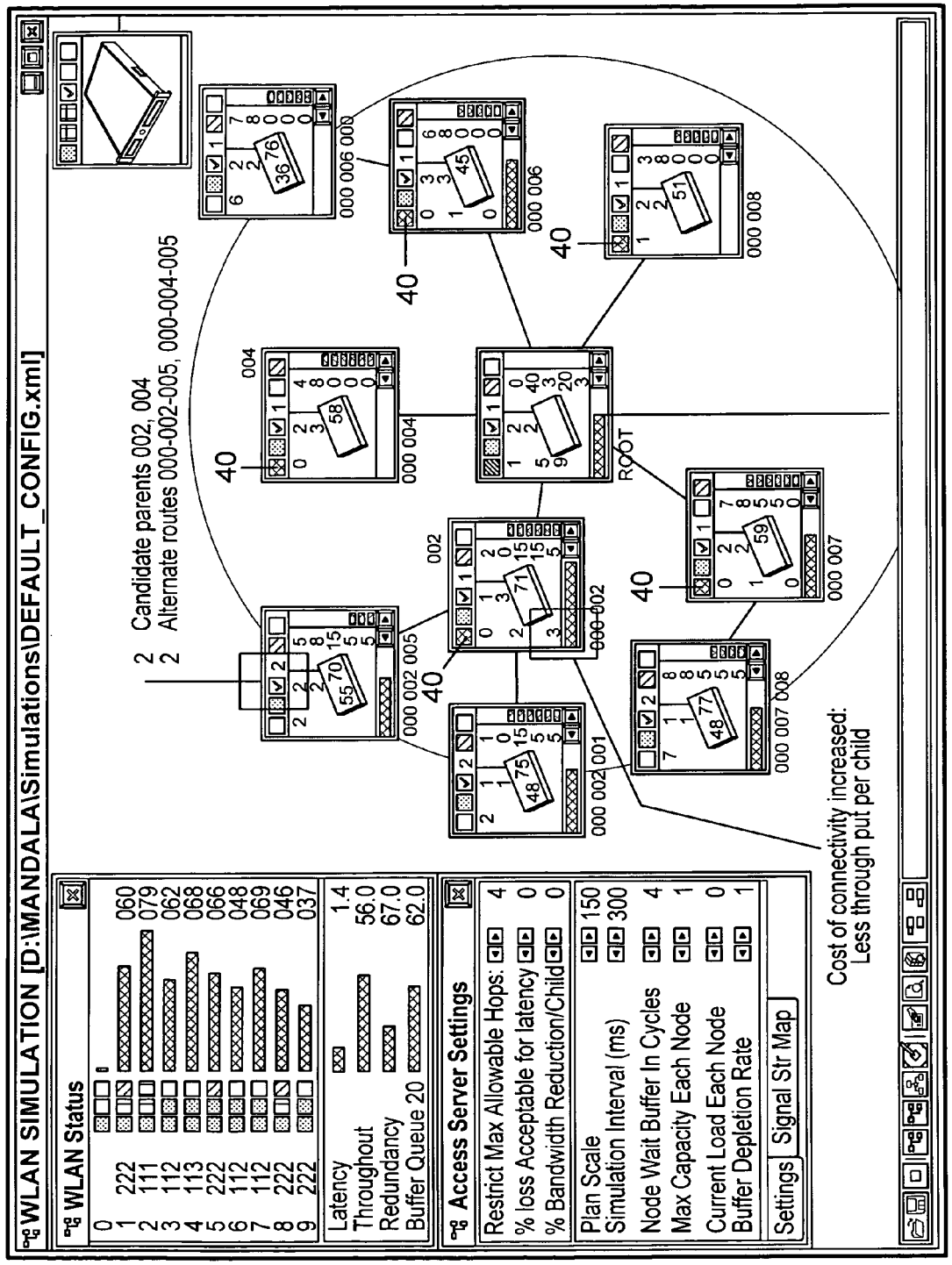
FIG. 7 illustrates how node increases its Cost of connectivity from 0 to 3 to reduce congestion according to an embodiment of the present invention.
Figure 8A:
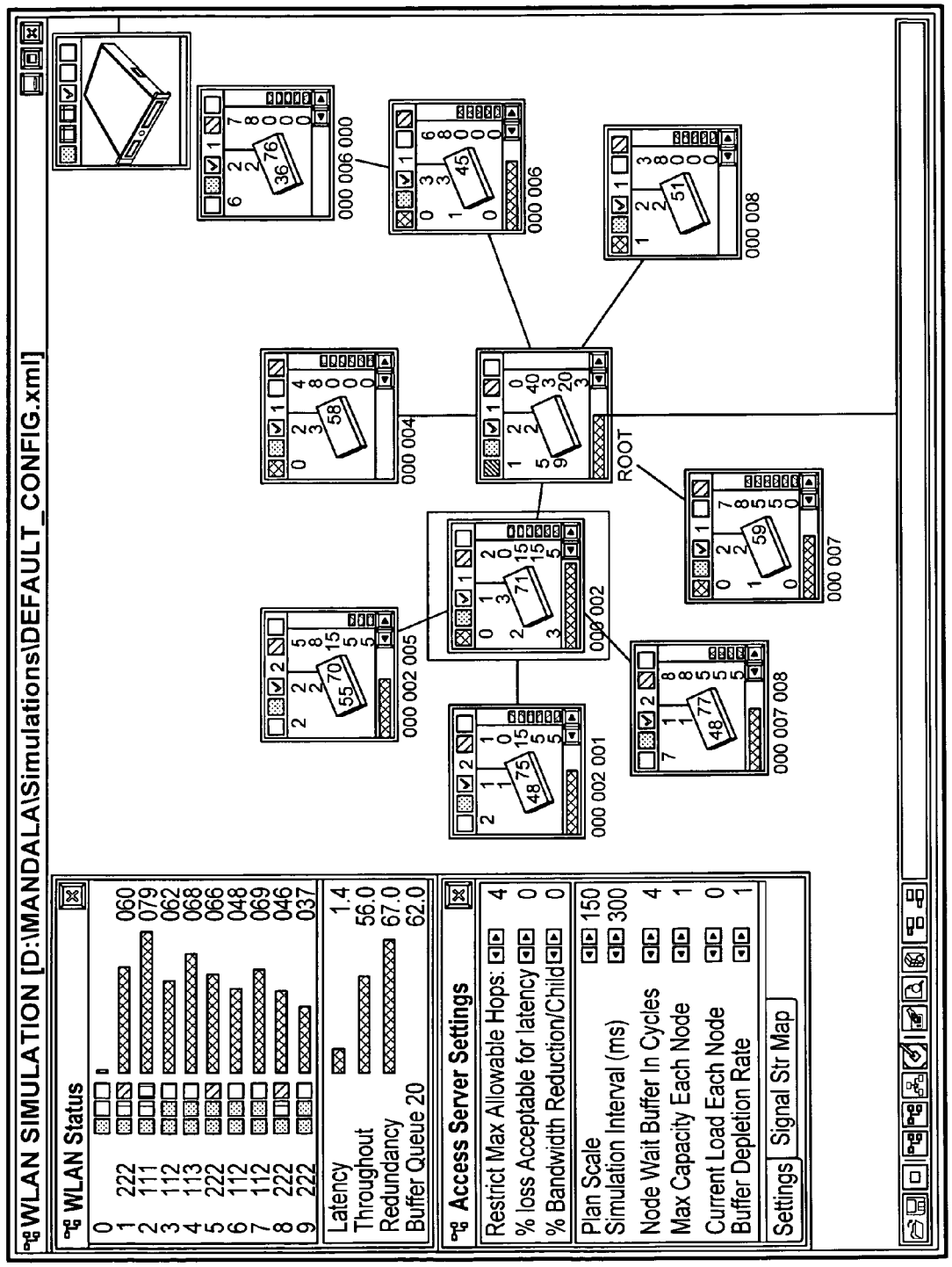
FIG. 8 illustrates how progressively increasing the cost of connectivity causes children to seek other routes according to an embodiment of the present invention.
Figure 8B:
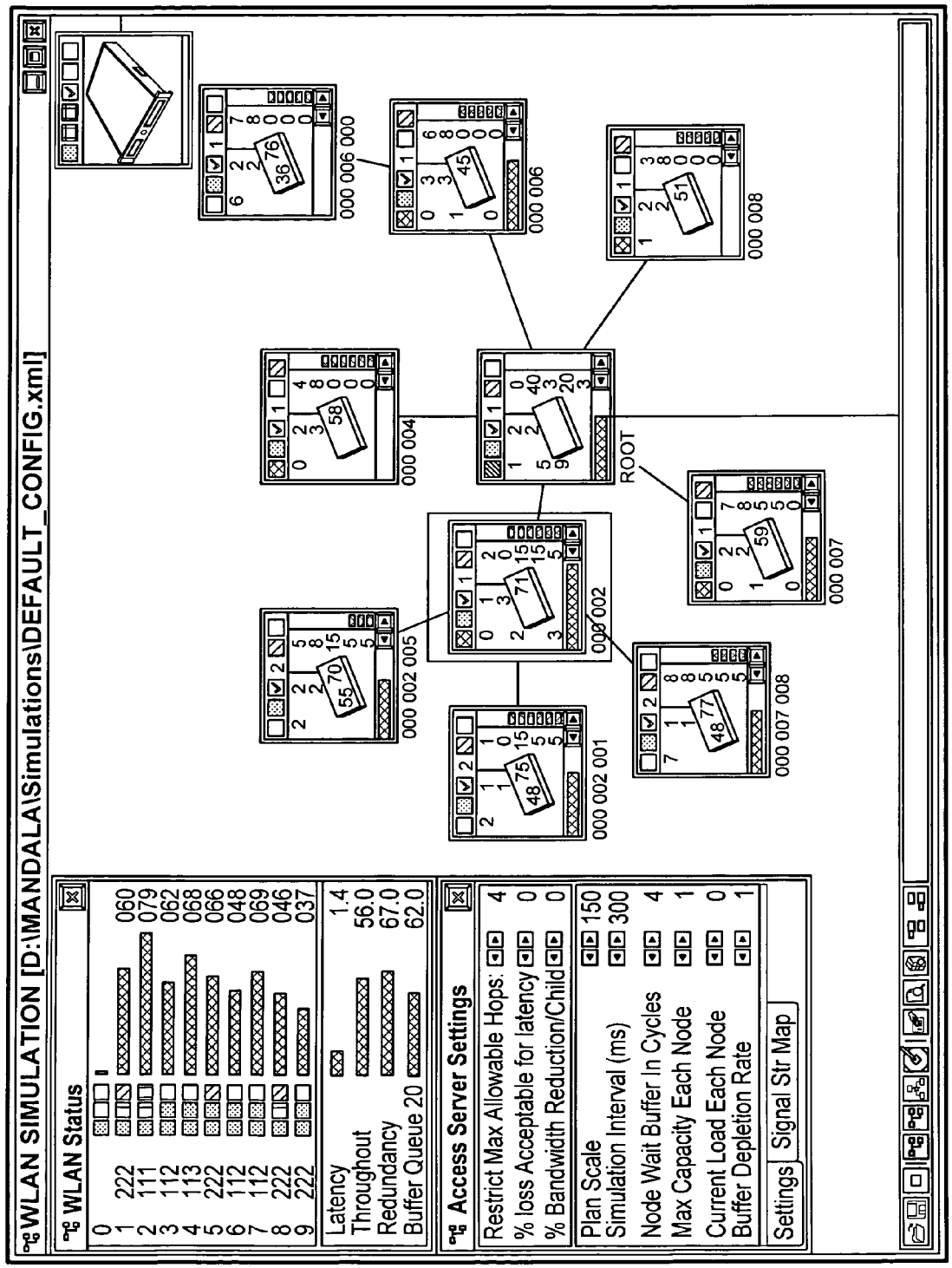
Figure 8C:
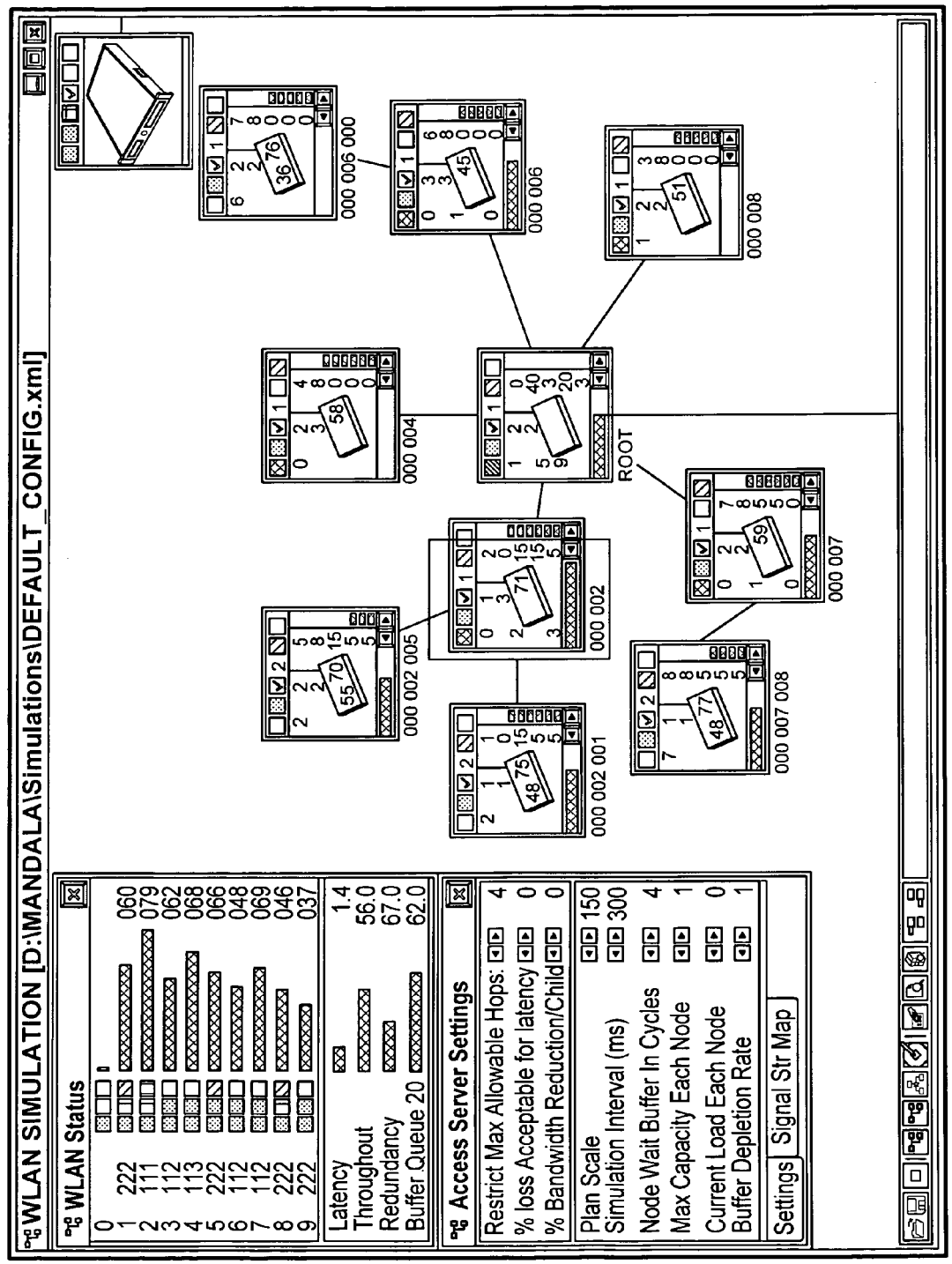
Figure 8D:
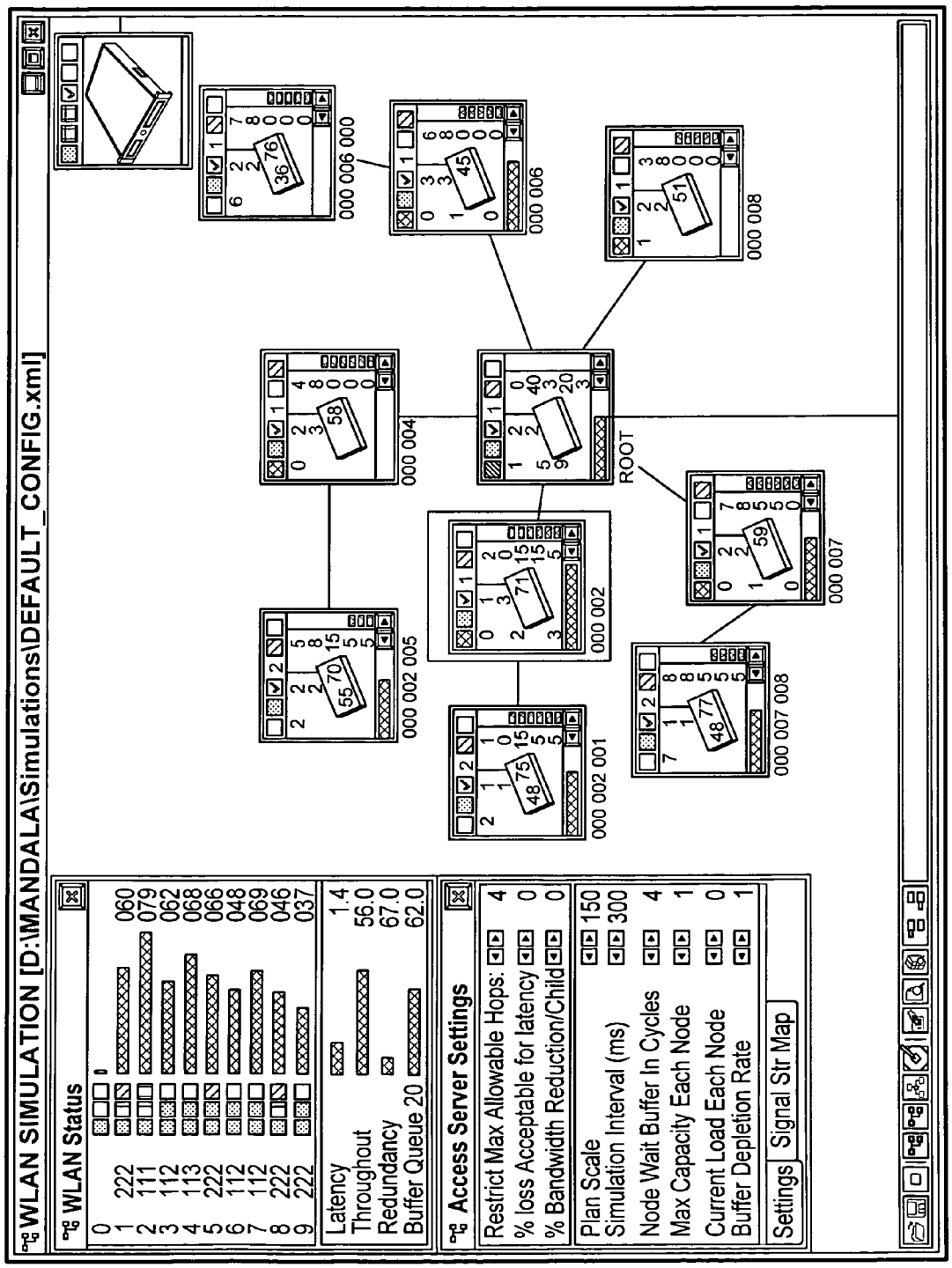

In FIG. 7, the cost of connectivity is raised from 0 to 3, resulting in one node "leaving" in favor of a better route. As the cost of connectivity is progressively increased, more nodes select alternate paths as evidenced in FIG. 8.

Increasing the cost of connectivity acts as an incentive for nodes to find other routes, but does not prevent a child node from continuing its association. This ensures that all child nodes are serviced always. Additionally, the cost of connectivity is increased only until all child nodes that have the option to leave have left—for example, in FIG. 7, the cost in increased only while child nodes that have multiple alternate route are still attached to a congested parent node. In other words, there is no reason to increase the connectivity cost for child nodes that have no alternate route and are "stuck" with the current congested parent node.

As the load is balanced, the congestion is reduced and the cost of connectivity is gradually reduced, enabling the child nodes that left to return. If this is not done, then nodes leaving one parent would contribute to congestion elsewhere, resulting in increased cost of connectivity elsewhere and system instability.

One characteristic of a mesh network is the ability for nodes to select alternate routes, in case one node fails or becomes congested. As shown in FIG. 7, each node, when computing the throughput of nearby nodes, also infers from the routing path for those nodes, how many alternate paths are available to it. This is done by examining the routing paths of each nearby node and classifying them based on the node that connects to the root.

In FIG. 7, Nodes 002 and 004 connect to the root—as do other nodes shown in one embodiment with a color indicated square on their top left corner (40), for instance this may be a blue square. Node 005, therefore, can have two routing paths: 000-002-005 and 000-004-005. Other nodes may also have multiple paths, but may not find a parent that, if it accepts them as child, has the capacity to service them, based on their current load. Hence, some of the nodes show one parent and one route, in another color indicator, for instance red (50).

It is desirable to configure the network to ensure all nodes have alternate paths. This is achieved by increasing the number of nodes connecting to the root. The access server can force this by increasing the latency cost factor, resulting in nodes that can connect to the root directly to do so rather than through another node closer to them to the root. This was described earlier as depicted in FIGS. 4, 5, and 6. It can also force some nodes to work in either low latency or high throughput modes—in FIG. 7, the check box for each node (checked in each case) depicts that each node is currently in high throughput mode, working within the constraints set by the access server.

By controlling the latency cost factor, or the upper bound of the max hops, the access server can change the configuration of the network resulting in a higher redundancy of the system and less likelihood of load congestion hot spots.

Real World Constraints to Load Balancing Algorithm

Implementation of the load balancing algorithm on the wireless devices, required modifications to the connect cost algorithms based on real world constraints. Wireless devices communicating with devices running the load balancing software may not all be running the same software. As an example, consider the case where the load balancing software is loaded on wireless Access Points but not on laptops communicating with the access points. Clearly, the laptop has no way of knowing that the connect cost has increased and therefore will continue to "stick" to the access point.

The load balancing algorithm has therefore been modified to work where there is no communication regarding connect cost by the following approach: When the load exceeds a cut off threshold, the Access Point (or other wireless device performing load balancing) will drop its signal strength to the lowest possible—thereby dissuading clients such as laptops from associating with it and encouraging them to seek another association with a higher signal strength access point.

Since the laptops seek the access point with the highest signal strength, this is a necessary but not sufficient cause for a re-association: some laptops may continue to "stick" to the access point, due to proximity or a sticky algorithm. The Access Point must therefore forcibly disassociate the laptop.

After disassociating all the stations that it needed to, in order to shed load, the access point can gradually increase its signal strength to attract back some the stations that it disassociated. Those that did not find other associations, will return, almost immediately after association, and the access point takes them back because despite the lowered signal strength, these devices have no place to go.

This load balancing algorithm has been implemented and demonstrated to shed load by moving one laptop from one root node to another when overloaded by two laptops on the same root node.

Monitoring the Health of the Network

By controlling the latency cost factor, or the upper bound of the max hops, the access server can change the configuration of the network resulting in a higher redundancy of the system and less likelihood of load congestion hot spots. In FIG. 7, Node 002 is shown congested and available "parents" that will accept it are reduced to 1 (shown in red (50)). As a result the redundancy and fail safe nature of the wireless network has been adversely affected.

Congestion in FIG. 7 is being caused by the fact that there is only one root node transporting all wireless traffic to the wired network. Clearly, another root node would improve the fail safe nature of the network.

Algorithms have been implemented that reside in the device and periodically check to see what potential associations are possible. If the number is reduced to one then a warning (shown in red) is forwarded to the Network Management System. The system administrator is then advised to add another root node to preserve the fail safe nature of the network. Note that this type of warning is coming from the edge device to the management system and without the algorithm in place, the management system would not know that a problem existed Dynamic Channel Allocation and RF Interference Control Managing the throughput of voice, video and data traffic in a wireless network is complicated by the nature of the wireless medium. Since wireless is a shared medium, all traffic can potentially interfere with other traffic on the same radio channel—at any point in time only one device can be active on any one given channel. This limits the bandwidth in cases where high bandwidth traffic (e.g. video) needs to be transported or when there are many devices on the network.

One solution is to allocate different channels to devices communicating on different portions of the network. For example, in FIG. 10, each of the 3 sub networks shown in Red (70), Black (80) and Blue (90) circles can communicate on one channel internally and another channel externally through the parent—that is part of the other BSS.

Figure 16:
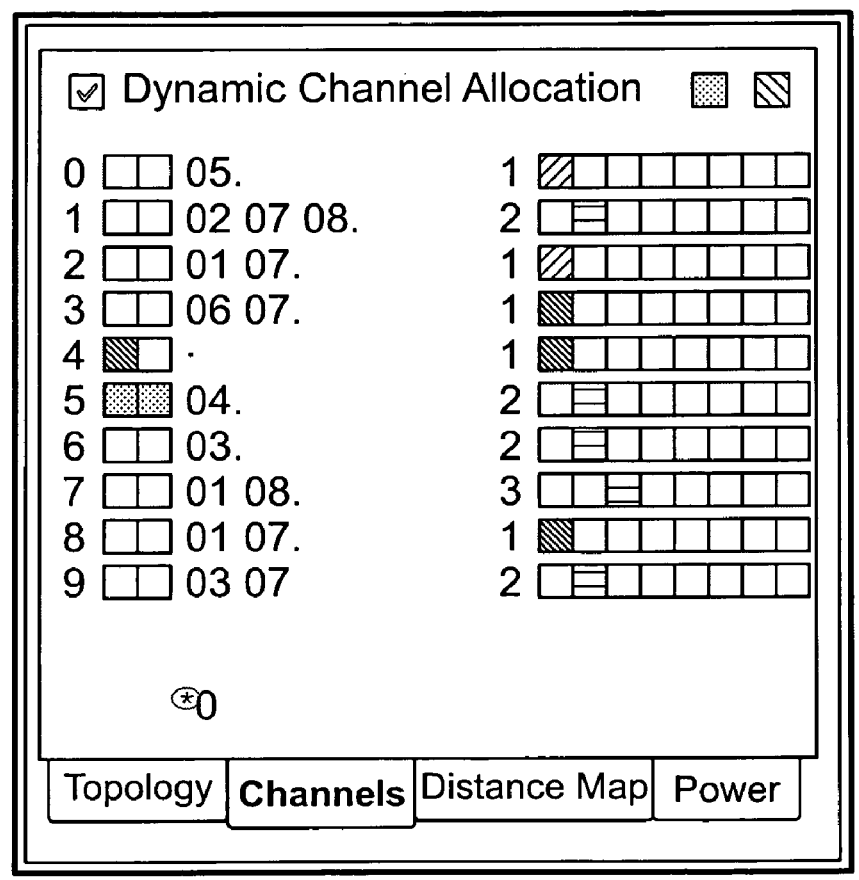
FIG. 16 illustrates an implementation of a Dynamic Channel Allocation Scheme to ensure non-interfering radio channel selection (enlargement) according to an embodiment of the present invention.
Figure 17:
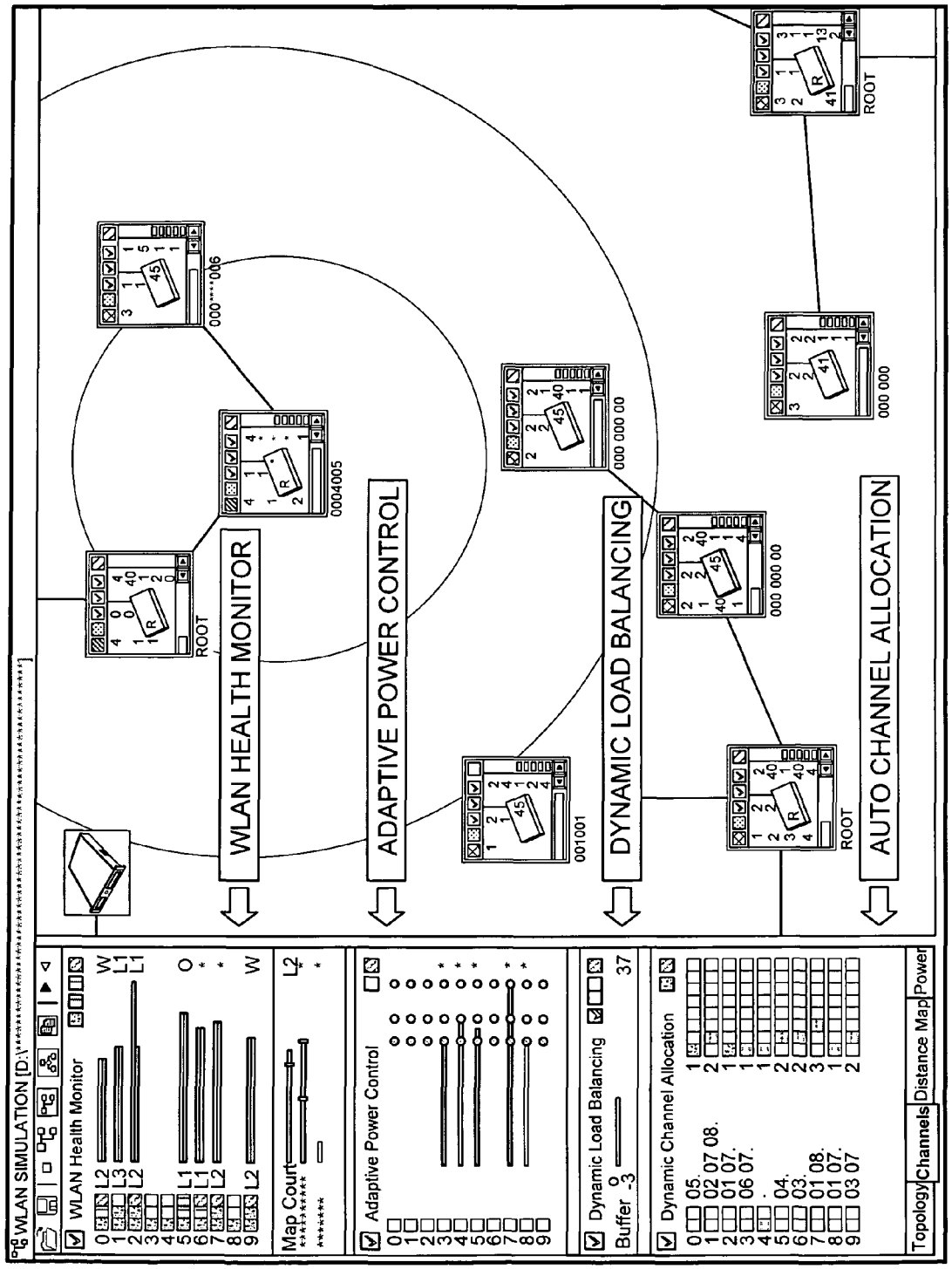
FIG. 17 illustrates an implementation of a Dynamic Channel Allocation Scheme to ensure non-interfering radio channel selection according to an embodiment of the present invention.
Figure 18:
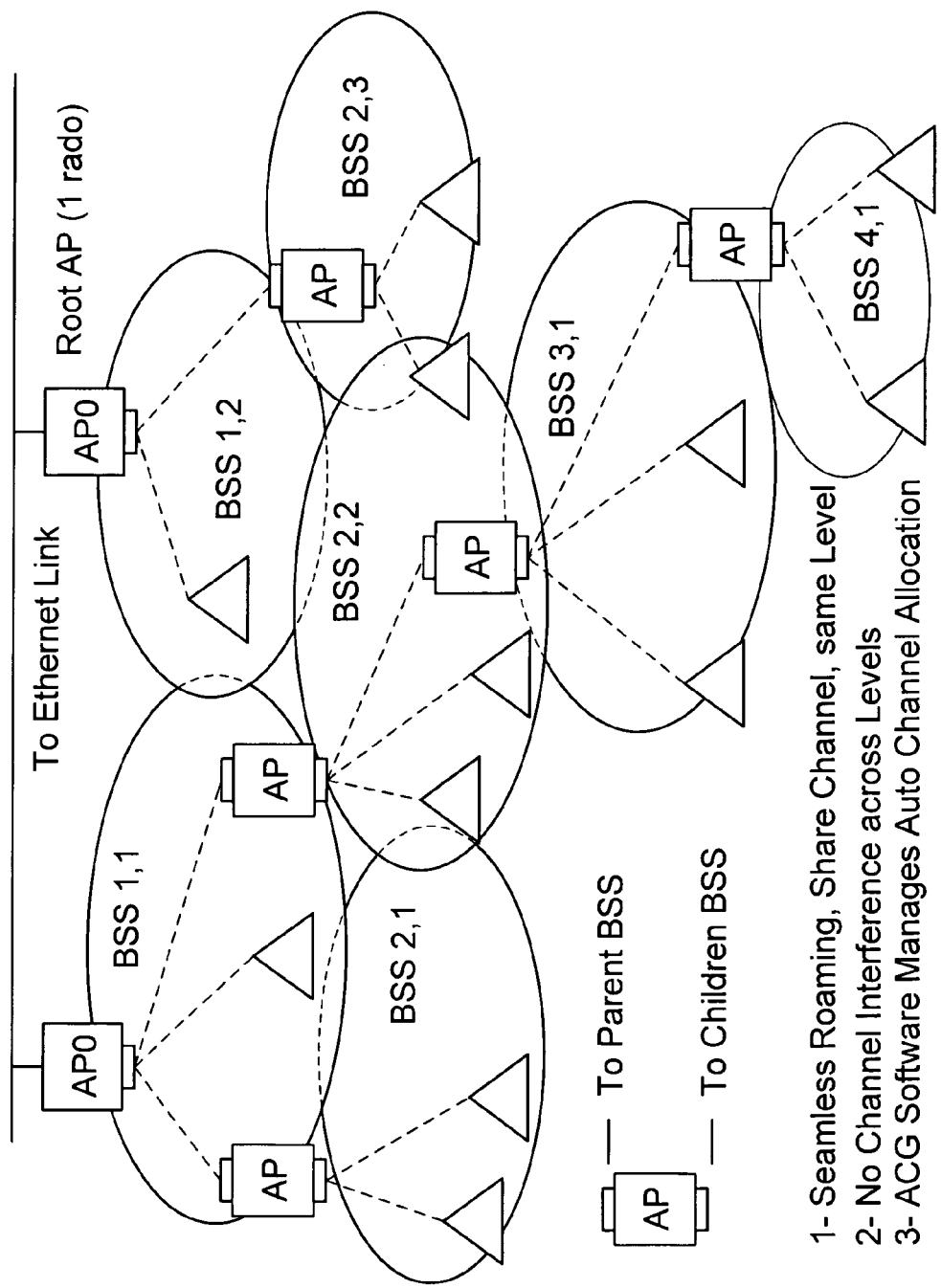
FIG. 18 illustrates an implementation of a Dynamic Channel Allocation Scheme to ensure seamless roaming in a multi hop mesh network according to an embodiment of the present invention.

An algorithm to define what the best channel allocations should be between devices and their parents has been devised and shown in FIG. 16 and in FIG. 17. The algorithm sends out a beacon on all channels to inform all neighboring devices that it is intending to select a channel. All neighboring devices—that can hear the beacon—respond over the wired network with the channel numbers they are using. The algorithm then takes care to select a channel, from a list of available channels that does not conflict with channels selected by neighboring devices Dynamic Channel Allocation and Seamless Roaming Requirements A situation can occur when, as shown in FIG. 18, some overlap between neighboring channels is called for. One reason for this is seamless roaming where a laptop leaves one wireless area and enters another adjoining area. If the signal strengths are managed, so that the overlap between adjoining areas is minimized, then adjoining areas can share the same RF channel and yet cause a reduction in bandwidth. Further, devices moving from one region to another will do so without having to change channels, which is time consuming and hence disruptive.

The algorithm implemented addresses the case where siblings of a multi layered wireless network are to be assigned the same channels. In FIG. 18 BSS [1,1] and share the same channel for access by their client stations. Also BSS [2,1], [2,2], [2,3] also share the same channels for seamless roaming by their client stations. The implementation of the algorithm therefore requires that when one sibling makes a channel assignment, ALL adjoining siblings have to make the same channel assignment. The channel selection process therefore requires a list of all neighboring nodes for all siblings and their RF channels. This extension has been incorporated into the channel allocation algorithm. Protocols for sharing this information have been implemented and tested. Appendix A hereto describes the 802.11 Infrastructure Control Layer Protocol version 2.0.

Note that seamless roaming requires that the Wireless AP shown in FIG. 18 have incorporated the features needed for switching—that is auto discovery of new clients in its BSS. Else messages being sent to a new client (previously connected to another BSS) will not be forwarded to the client, now part of the another BSS. The wireless equivalent of a wired switch has been implemented and is covered in a subsequent section.

Asynchronous Application Data Flow

Algorithms that show how data from nodes will flow to the root node have been modeled for both high throughput and for low latency requirements. High throughput data flow requirements are discussed first.

To service asynchronous applications each node services its children in a round robin manner, ensuring that all children are serviced in sequence. But to ensure that all children receive at least one service request, each recently serviced child must wait for at least another child to be serviced before it can be serviced again. Additionally, some child nodes servicing applications with higher priority will be serviced before others.

In one implementation of this algorithm, related to this invention, the priorities may be stored in the Access server and different applications fall into different priority buckets. By changing the priorities in the Access Server, applications with higher priority are serviced before other competing applications with a lower priority. Also with a priority bucket, applications with more data to transfer are serviced first.

In another implementation, the determination regarding which child to service next is based on which child needs servicing the most. This is determined by examining the load of each child, each time; the node services its children. It is done each time because:
 Child nodes may have made other connections, if load balancing is also active
 Child nodes data may have changed—data with short time to live, will have been removed
The node then makes the decision to service the child with the highest need, in a priority bucket, provided it has not serviced that same child most recently. This is simply to avoid any one child from "hogging" all the attention.

Figure 9:
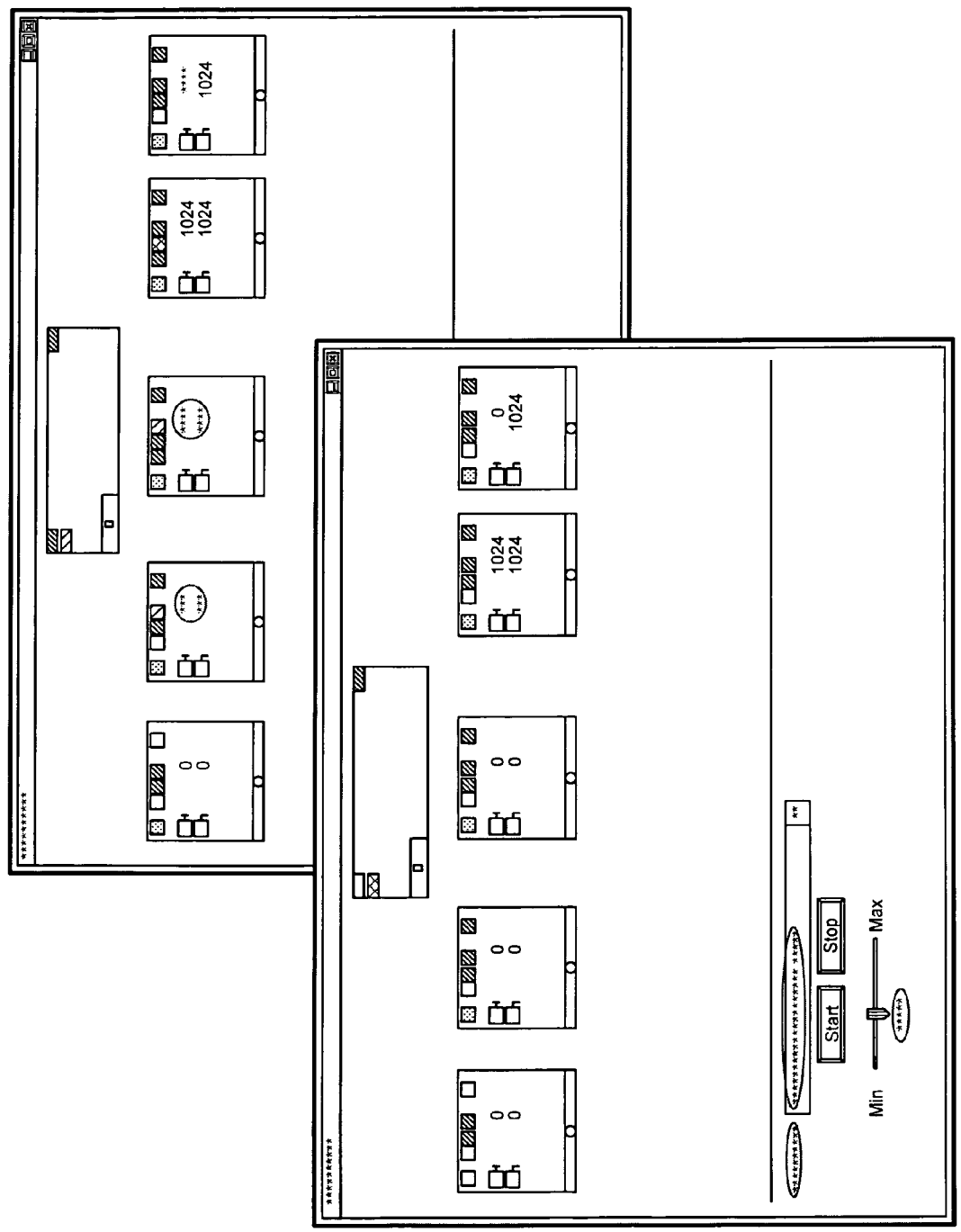
FIG. 9 shows the modeling of both the DCF and PCF algorithms described, based on 802.11X specifications according to an embodiment of the present invention.

This proprietary PCF (Point Control Function) implementation worked well for asynchronous applications, when compared to 802.11a standard DCF (Distributed Control Function) approach that was also implemented for benchmarking reasons as shown in FIG. 9. The PCF protocol implemented per the approach described above was approximately twice as fast, largely because nodes did not have to deal with delays caused by collision avoidance contention window delays required for wireless transmissions in a DCF mode.

Isochronous Application Data Flow

Isochronous applications require more deterministic service intervals that are less sensitive to variations of load. The algorithm described above is not suitable when:

Each child must be serviced by the parent in a regular and predictable time interval The amount of data transferred is relatively fixed—else it will affect the time interval.

Figure 10:
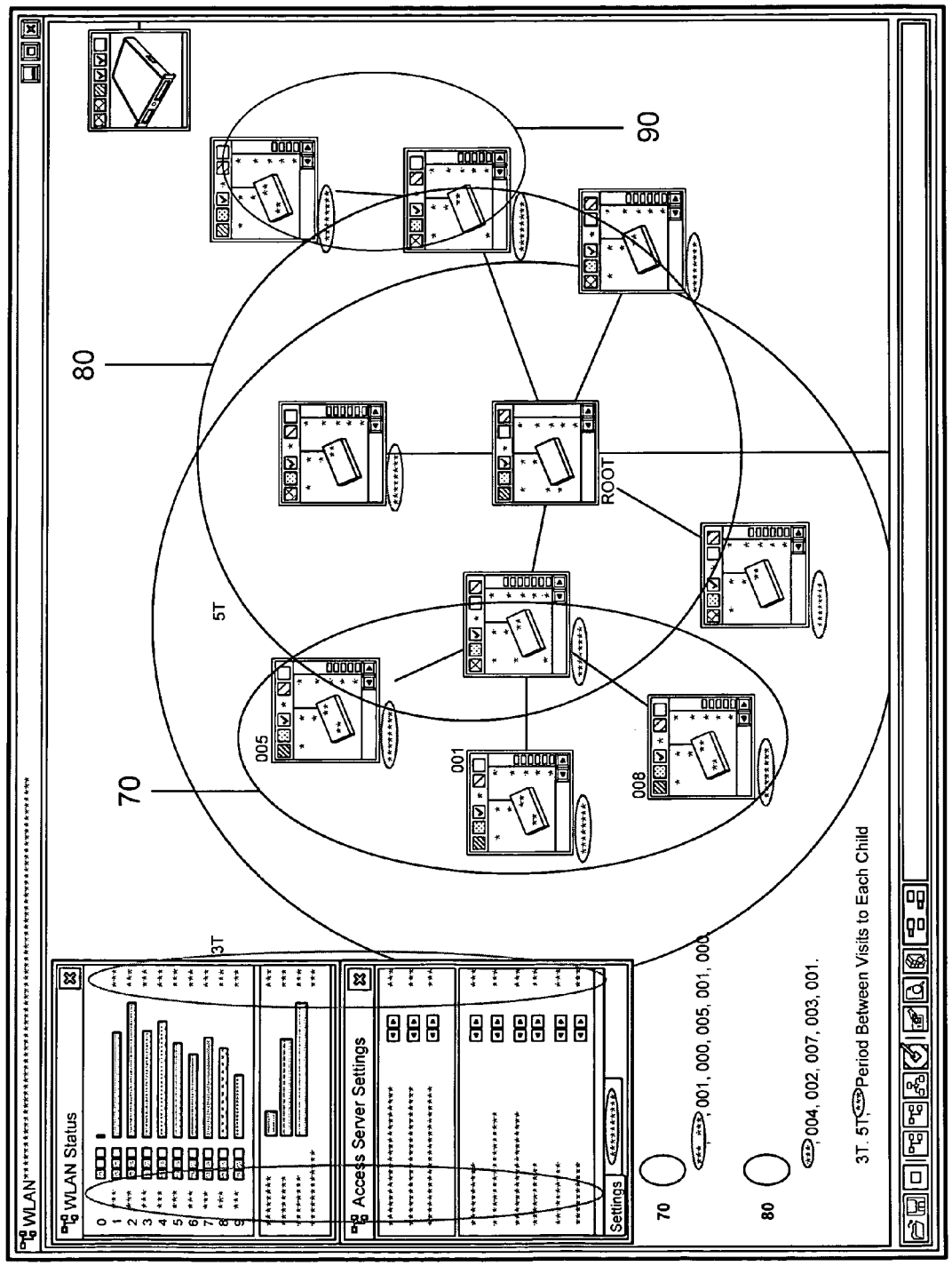
FIG. 10 illustrates how the worst timing constraint for an Isochronous PCF mode would be 5 T according to an embodiment of the present invention.
Figure 11:
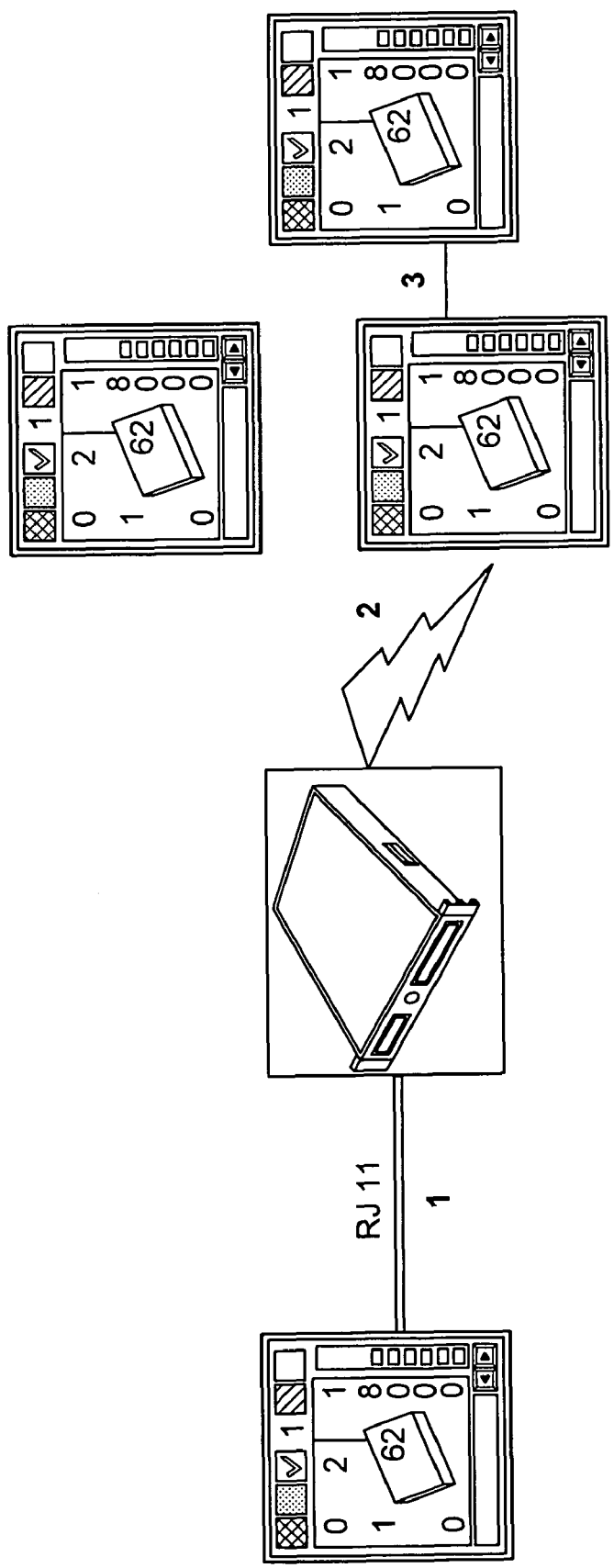
FIG. 11 shows the Key distribution for AES symmetric private key distribution under PKI for distribution according to an embodiment of the present invention.

The algorithm to service Isochronous Application has also been implemented. In FIG. 10, there are two service cycles. One service cycle (70) services 3 children, the other one (80) 5 children, one of which is the parent node of the three children in the first service cycle (70). In each service cycle, each child is visited at a regular interval defined by 1) the time interval between each switching from one child to another and 2) the number of children in each service cycle.

Thus if the parent of the red service cycle (70) spends 10 ms with each child, it will revisit each child every 3*10=30 ms. Data from each child cannot then be retrieved at a rate faster than once every 30 ms.

Having retrieved the data, it will sit at the buffer of the parent, until the parent is serviced (the black (80) circle). Since there are 5 children in that service cycle, the service period is 5*10=50 ms.

Since both service cycles are running independently of each other with no synchronization, it is impossible to predict when the parent in either service cycle will service its children. It can be stated, however that each child in service cycle marked red (70) (005, 001, 008) will have data transferred to the root at best every 30 ms and at worst every 50 ms. In other words, in the isochronous network, the worst time interval is the maximum time period of all service cycles.

If it is assumed that, to ensure multiple routing paths, there are more nodes connected to the root, then the service cycle will be driven by the number of 1 hop nodes, in this case 5. Note that the network configuration is set for high throughput. In this configuration the worst service cycle is 5 T. Ironically, the network configuration for a "low latency". Isochronous network would have been 9 T, will all nodes connected to the root. In other words, in the case of isochronous networks, the algorithm proposed provides a better service cycle and a better throughput. In general, splitting the number of nodes into two or more service cycles will improve the service cycle. The high throughput mode setting for the routing algorithm makes that happen naturally.

Internal Traffic Flow/Wireless Equivalent of Switching

Referring again to FIG. 10, Nodes 005, 001, 008 are children of Node 002. The red oval (70) indicates that these form a "family". In the technical parlance of 802.11, they are a "Basic Service Set" (BSS). Likewise the nodes in the black circle (80) form another family or BSS.

Traffic from Node 005 to Node 001 would logically travel to Parent 002 and then from 002 to 001. This affects the throughput of the entire system because the traffic is buffered in 002 and then retransmitted. If node 005 was aware of its siblings, within its wireless range, then Node 005 and Node 001 could communicate directly over wireless. In effect this would be a wireless equivalent of Ethernet switches.

This direct communication link between siblings (within range) increases throughput 100%. This is so because 2 transfers of data (Source node to parent and then Parent to destination node) are now reduced to 1 transfer (Source node to destination node).

In this embodiment, the algorithm has been implemented whereby traffic intended for a destination node is automatically sent to the destination node if it is within the family/BSS and within range. When the routing algorithm runs, the routing paths of each nearby node is recorded to determine the number of hops it is away from the root. From the routing paths, the list of siblings within range can be inferred—they all share the same parent in their routing paths. If data intended for these siblings is received, it will automatically be sent to the sibling, without involving the parent.

If the destination node is not in the list of nearby siblings, then the data has to be sent onwards to the parent node. At that point the parent node, which "knows" its siblings, can route traffic to one if its siblings. Thus the switching algorithm ensures that traffic is routed only as far as a parent whose child is a destination node.

Extensions with Multiple Radios

As shown in FIG. 10, there are at least two families or BSS in the network. Node 002 belongs to both—as a parent of one (the red oval BSS) (70) and as a child to another (the black circle BSS) (80). To communicate with its children, Node 002 has one radio, and another to communicate with its parent. There is preferably therefore, at the minimum, two radios in each node for the system to work—One radio to support the inward interface (the children, red oval (70)) and one to support the outward interface (the parent, black circle (80)).

Adding more radios to the outward interface increases throughput but also enables more freedom in making choices related to latency/throughput tradeoffs. For example, suppose that some traffic requires high throughput and other traffic low latency. If the compromise approach described in this invention is unacceptable because the range of requirements are too high, then two radios for the outward interface can reduce the range of requirements: One radio will address more of the low latency traffic with a low latency traffic route while the other will address the high throughput needs with a different high throughput traffic route. The wireless node now begins to resemble a wireless equivalent of network routers.

The algorithms described in this invention are still applicable: only the range of applicability has changed. The embodiment of the present invention is also relevant for wireless routers.

Security of the Network

Wireless transmissions are inherently insecure. While the technology to encrypt/decrypt secure data exists, the problem is communication of the keys over wireless to the nodes, from the access server. This common key distribution problem is addressed by the following embodiment of the system.

The wireless communication devices will have, as part of the algorithms resident in their operating system, the ability to generate a public and private key based on the RSA algorithm. These keys will be based on some unique identifier in the AP node—the processor Chip Serial Number as an example.

When the Wireless device is first deployed, it will be connected via Ethernet cable to the access server and the node's public key will be transmitted to the Access Server. This public key will be used by the Access Server to transmit a common private key (using the symmetric AES encryption algorithm) to all nodes. Since only the Access Server knows the public key for each node, only the access server will be able to transmit this private key. Further, since the common private key for all nodes was transmitted in encrypted form to all nodes, it is impossible to decipher the common private key without knowing the public key for the node it was intended for. In addition, even if that public key for that node is known, it is useless since the private key for that node was never exchanged. The transmission of the common Private Key is thus secure.

Secure data transmitted by one AP node will then be encrypted with the common private key and be decrypted only at a destination AP node. By the same token, all data from the Ethernet to an AP node will be encrypted with the same private key for onward transmission.

The enterprise Access Server can be used to generate a new private key at regular intervals and transmit it to all Wireless AP Nodes in the system. The system is thus doubly secure.

Implementation of Algorithm in Firmware

The control algorithms described above require significant resources—CPU. Memory—resulting in large footprint applications. Wireless devices and other network aware communication devices are typically embedded systems with low foot print requirements. A challenge that must be addressed—if this technology is to have practical applications is how to reduce the footprint of the software control layer to fit into embedded devices with 64 KB or 128 KB RAM.

Figure 15:
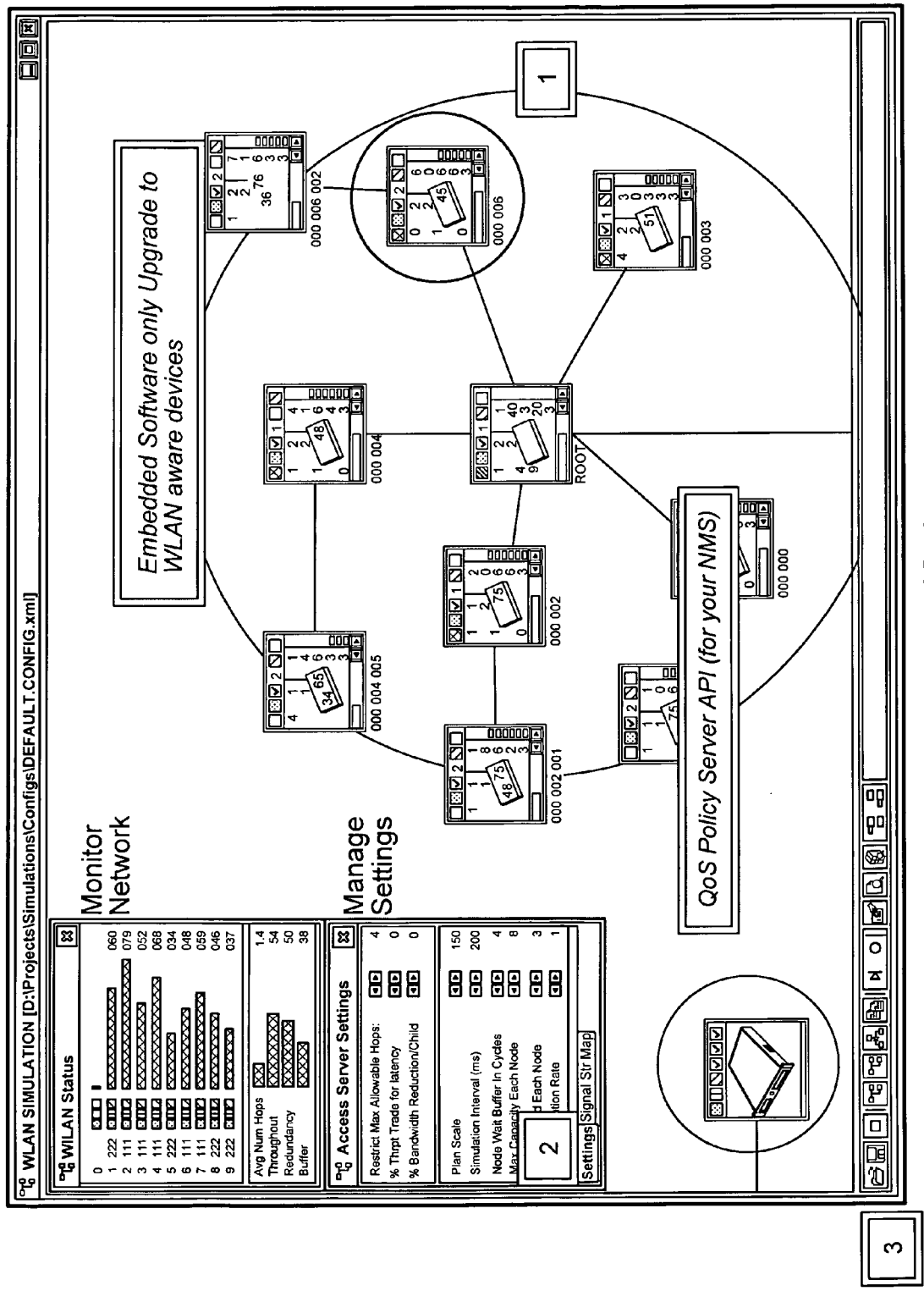
FIG. 15 illustrates an implementation of a complete system including three components of one product offering, according to an embodiment of the present invention.

A self-standing executable containing some of the algorithms and support functions has been produced within a footprint of less than 100 KB running on an Intel PXA250 Processor. Additionally in an embodiment of the present invention, the mesh and load balancing algorithms have been successfully ported to run on the hardware depicted in FIG. 15, with a footprint of 64 KB.

The reason for the small footprint is that the approach of the embodiment of the present invention to building software is to include only the portions of an operating system needed by the programs. Thus, only functional blocks needed by the algorithms are added to the make file needed by the compiler to create the executable. If string functions are not required by any procedures in the program, then the string function library is not included when the executable is made. In contrast, a typical embedded operating system is more general purpose, requiring a larger footprint and possibly more CPU resources.

The language in which the algorithms are written is currently Java, and will may also include Microsoft™ .NET languages. In the embodiment of the present invention, a Java Class file converter has been built that takes Java Byte Code and disassembles it to produce what is referred to internally as R (for Real) classes. R classes are the C code equivalent of the Java Op codes, used by a Java Virtual Machine (JVM) to run the Java program. The R classes map to C code which is produced after examining the functional libraries needed and adding them to the list of support libraries needed to make an executable self standing. Once that is completed a self-standing executable is made for the processor.

An extensible service library of software components needed to build a complete Operating system (OS) is implemented through the embodiment of the present invention. This component based approach to building an Operating system from scratch enables one to select only the essential services needed by an application when it is ported from high level languages to small footprint embedded devices. Since only the essential services and not an entire general purpose OS is included, the footprint is compact. Additionally, there is a significant (3×-6×) performance improvement because layers of software needed to run code written in high level languages like Java or .NET languages are no longer needed.

Figure 13:
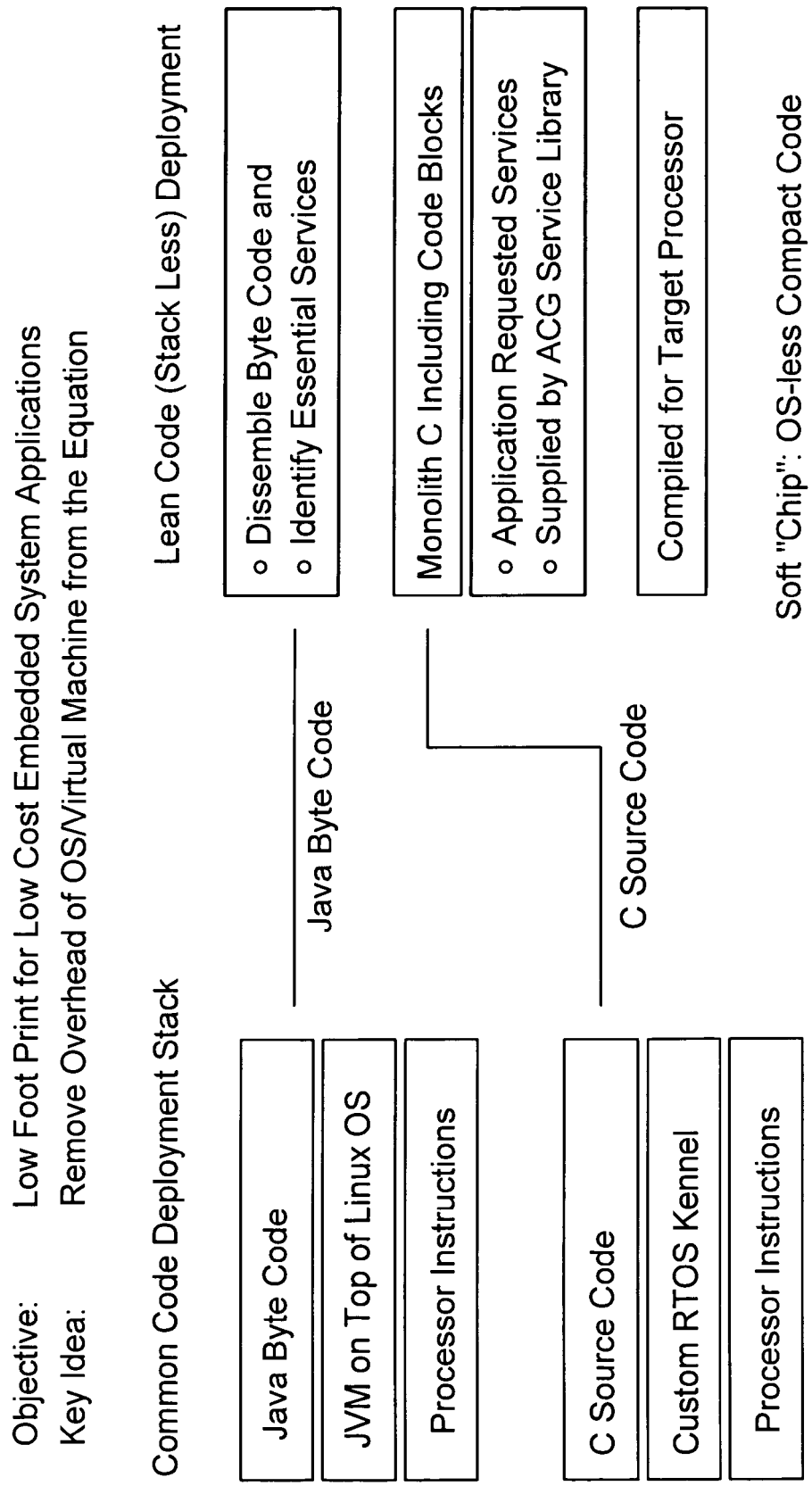
FIG. 13 illustrates the process for low footprint code generation from Java or C, with ACG RTOS library components according to an embodiment of the present invention.

FIG. 13 depicts how the approach of the embodiment of the present invention to lean code generation differs from more traditional approaches. On the left of the figure are the layers or stacks needed to run Java (JVM on top of linux) or C (on top of a custom RTOS OS like VxWorks). On the right is an embodiment where Java code is examined at the Byte code level to identify essential services. These services are added when the Java Byte code is converted to C—by mapping Java Op codes intended for a JVM to code blocks from a library of C equivalent code blocks. For C code, this means simply adding the OS service code blocks needed for the C program to run without an RTOS below it. In both cases, as depicted in FIG. 13, A monolith block C code is produced, much like a compiler would, except that all the services are statically bound at development time and no dynamic bindings are required at run time, as is the case with the layered approach on the left.

Thus there is a clear migration strategy in place from high level code generation to low level object code that includes all the functionality provided by an operating system to ensure that the object code is self contained.

Figure 14:
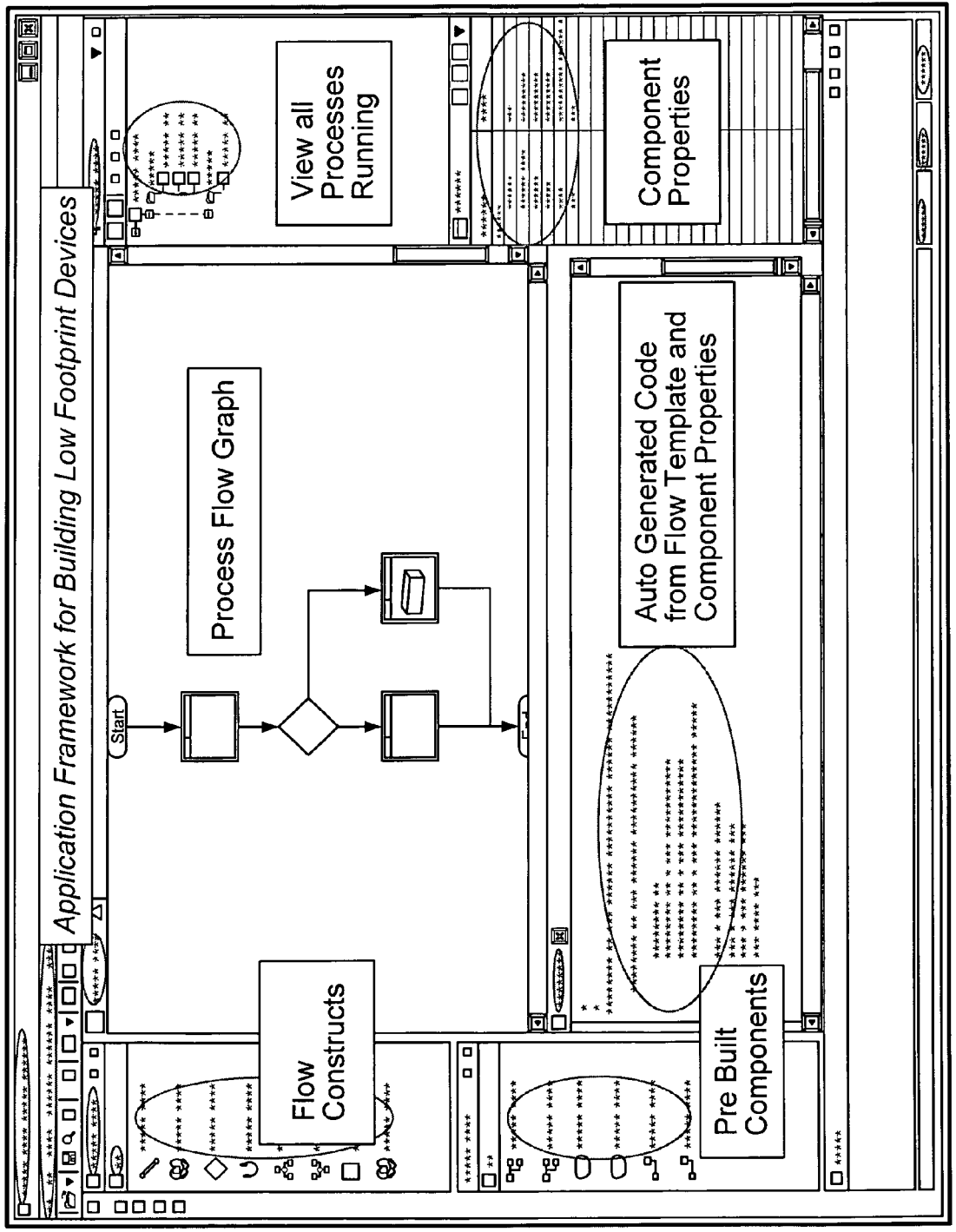
FIG. 14 illustrates the implementation of a method to generate low footprint code from Java according to an embodiment of the present invention.

There is implemented one version of this migration strategy where one begins with high level code written and tested in a development environment and can swiftly migrate it to a low footprint executable. FIG. 14, depicts an extension to IBM's open extensible framework for development, called Eclipse (www.eclipse.org). As shown, there is built a framework on top of eclipse that enables one to model processes as a flow graph, where at each node of the flow graph one can insert code that needs to be tested. The framework is also used to do a performance analysis of code blocks at each node to determine where the bottlenecks are. At the end of the debug and analysis cycle, Java Byte Code is passed on to the Byte code converter (shown in FIG. 13) for low footprint code generation.

Since there is no OS, there is no easy way to tamper with the system. This approach—internally referred to as Application Specific Embedded OS software—thereby protects the security of the algorithms and enables the algorithms to run on low power (and less expensive) processors and with lower (and less expensive) memory requirements.

Figure 12:
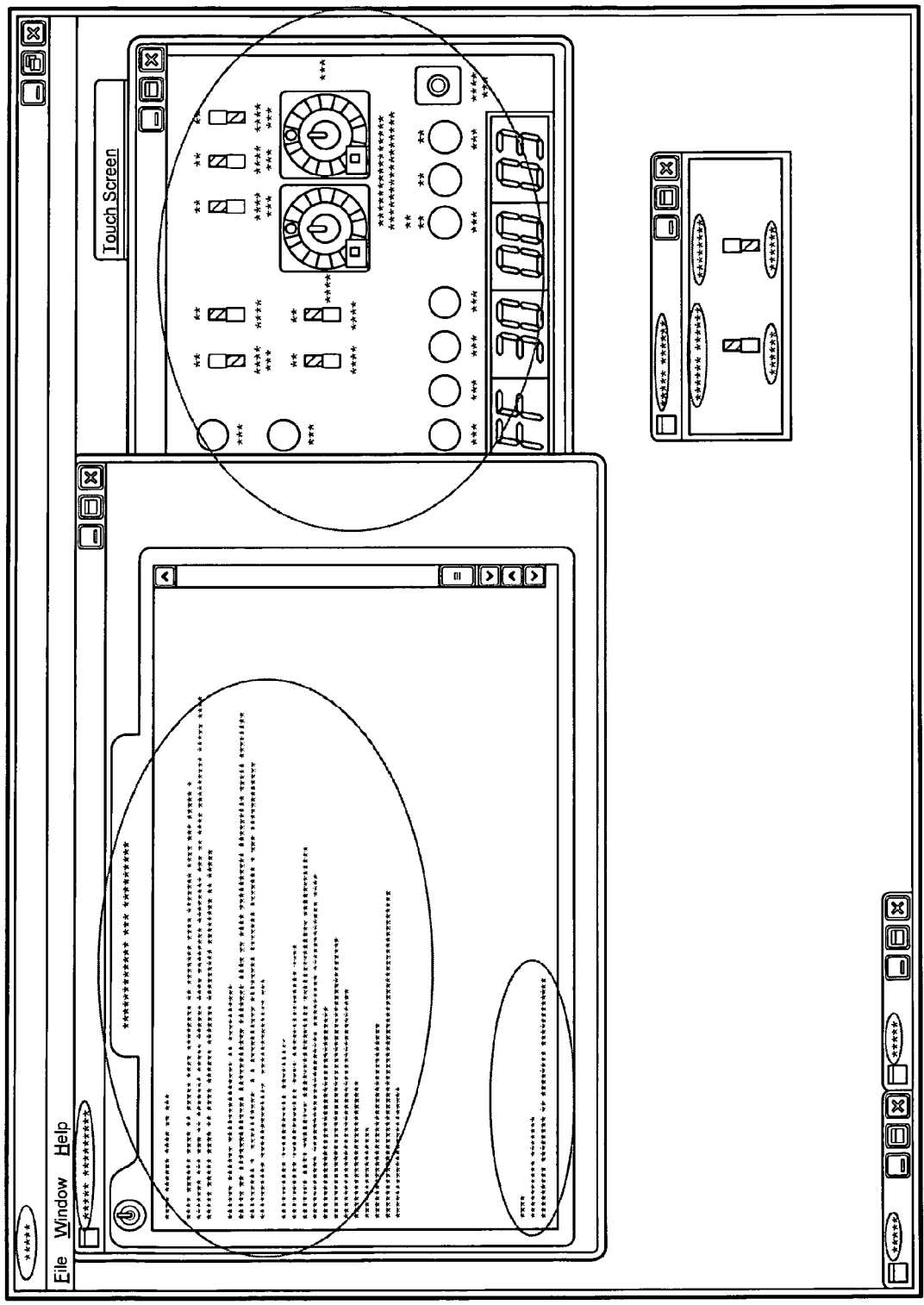
FIG. 12 illustrates ACG RTOS running algorithms in Intel PXA250 emulation environment according to an embodiment of the present invention.

The simulations depicted are running the same code in each node shown in the figures. The code running in each node has been compiled to object code for the Intel™ PX250 processor as a proof of concept (FIG. 12). It has also been compiled to run on a embedded system development platform shown in FIG. 15.

Upgrade Path for New Algorithms

A distributed network poses problems related to upgrading the software at each node. If the software is cast in concrete—as in an ASIC implementation—then there is no upgrade path available. Since the wireless standards are evolving, this is not a practical approach.

In the description of the embodiment of the modular approach to generating a self standing executable, it becomes apparent that there is no migration path available to the system to upgrade the executable easy.

This is resolved by providing a simple communication protocol for uploading new object code into the system. This has also been implemented as is internally called Simple Upgrade Protocol (SUP).

When the executable is made, a simple communication protocol is added, which, with proper authentication, using the public key of the node, can be used upload object code into the Flash memory of the device. A very thin boot kernel with the AP Node and the rest of the code is remotely installed. The boot kernel contains the simple communications protocol to upload object code and the security to ensure that only the Access Server can access the device. By building security at the boot level, one ensures that all code loaded into the system has to be authorized—since the security code cannot be overwritten.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

APPENDIX A

Exemplary 802.11 Infrastructure Control Layer Protocol Version 2.0

Design Considerations

Size Limitation

Since an Ethernet packet can only be a maximum of 1500 bytes the maximum length of a UDP datagram so as to not cause IP fragmentation is 1472 (1500−20 byte IP header−8 byte UDP header). Every SNIP packet consists of a 8 byte SNIP header followed by parameters. Since all IMCP functions use only 1 SNIP parameter the maximum length of the parameter value is therefore 1462 (1472−8 byte SNIP header−2 byte param length).

Packet Destination

All SNIP packets (either from Access Manager or from A/P) are sent via UDP to either the limited broadcast (FF: FF: FF: FF: FF: FF) or a chosen multicast address (01:00:5E:XX: XX:XX).

This method ensures that all A/P's get the message and also obviates the need for assigning I/P addresses to every A/P.

DEFINITIONS

Network Health Monitoring

Health Index

The number of unique Root paths determines the Health Index of an Access Point. In an "All-Root" network the Health Index determines the degree of redundancy of the Access Point's location. In an infrastructure mesh network for Relay nodes the Health Index determines the number of unique paths to the "wire".

Heartbeat Interval

This attribute specifies the interval at which Access Points send in a "heartbeat" signal, that specifies the conditions of their operations.

Location Awareness Scan Interval

This attribute specifies the interval, at which Access Points scan the "airspace" to know about other Access Points in their vicinity, to determine their Health Index and for Dynamic Load Balancing purposes.

Dynamic Load Balancing

This Boolean attribute, determines whether an Access Point enables the adaptive dynamic load balancing functionality during its operation. If enabled the Kick-in Threshold and Delta T attributes determines the way this functionality is put to use.

Connect Cost

The Connect Cost is a value in the range [0,3] where 0 being the minimum Connect Cost. The Access Point increases its cost of connectivity during Dynamic Load Balancing, after it determines that the load has stayed beyond the Kick-in Threshold for a period of Delta T units. The Connect Cost is adaptively reduced according to the load.

Delta T

This attribute determines the duration of sampling for the Access Point to determine that the load was higher or lower than the Kick-in threshold for Dynamic Load Balancing purposes.

Kick-in Threshold

This attribute is a percentage of the total capacity of the Access Point. This is used in conjunction with Delta T for Dynamic Load Balancing purposes.

Dynamic Channel Allocation

Channel Number

When Dynamic Channel Allocation is disabled, this attribute specifies the channel of operation for the Access Point.

Topology

Latency Throughput Control

When zero, this instructs the Access Point to always choose a Parent, whose hop count is lowest. When non-zero, the Access Point may choose to "tradeoff" latency for throughput provided the difference in throughput is more than Latency/Throughput Trade-Off attribute.

Max Allowable Hops

This attribute controls the topology of the wireless network so that, any Access Point is never more than Max Allowable Hops away from the "wire".

Latency/Throughput Trade-Off

This attribute determines, the difference threshold for an Access Point to choose a parent with more number of hops in exchange for lower latency.

PACKET INFORMATION

STA Association Notification

| | |
|---|---|
| Direction | AP to Broadcast/Multicast |
| When Sent | Upon STA association |
| SNIP FUNCTION ID | 3 |
| Purpose | Topology Updating |
| Param 0 Value Format | |

```
+----+----+----+----+
| 'T'| 'M'|'C'|'P' |       4 byte signature
+----+----+----+----+----+----+
|      DS MAC ADDRESS     | 6 bytes  |
+----+----+----+----+----+----+          } AP Identifier
|      WM MAC ADDRESS     | 6 bytes  |
+----+----+----+----+----+----+
|      STA MAC ADDRESS    | 6 bytes
+----+----+----+----+----+----+
```

Total Size
22 Octets

STA Disassociation Notification

| | |
|---|---|
| Direction | AP to Broadcast/Multicast |
| When Sent | Upon STA disassociation |

PACKET INFORMATION

SNIP FUNCTION ID  4
Purpose  Topology Updating
Param 0 Value Format

```
+----+----+----+----+
| 'T'| 'M'|'C' |'P' |   4 byte signature
+----+----+----+----+----+----+
|    DS MAC ADDRESS      | 6 bytes
+----+----+----+----+----+----+  } AP Identifier
|    WM MAC ADDRESS      | 6 bytes
+----+----+----+----+----+----+
|    STA MAC ADDRESS     | 6 bytes
+----+----+----+----+----+----+
| REASON |    2 bytes
+--------+
```

Total Size
24 Octets

Access Point IMCP Synchronization

Direction  AP to AP
When Sent  When an AP starts up or during scanning
SNIP FUNCTION ID  11
Purpose  Identification, Health, Topology
Param 0 Value Format

```
+----+----+----+----+
| 'T'| 'M'|'C' |'P' |   4 byte signature
+----+----+----+----+----+----+
|    BSSID    | 6 bytes
+----+----+----+----+----+----+
```

Total Size
10 Octets

Access Point IMCP Acknowledgement

Direction  AP to AP
When Sent  Upon receipt of IMCP Sync
SNIP FUNCTION ID  12
Purpose  Identification, Health, Topology
Param 0 Value Format

```
+----+----+----+----+
| 'T'| 'M'|'C' |'P' |   4 byte signature
+----+----+----+----+----+----+
|    BSSID    | 6 bytes
+----+----+----+----+----+----+
|    ROOT BSSID | 6 bytes
+----+----+----+----+----+----+
```

Total Size
16 Octets

Seek Best Parent Request

Direction  AP to Access Server
When Sent  Upon startup and frequently

PACKET INFORMATION

SNIP FUNCTION ID  13
Purpose  Topology Formation, Operation
Param 0 Value Format

```
+----+----+----+----+
| 'T'| 'M'|'C' |'P' |   4 byte signature
+----+----+----+----+----+----+
|    DS MAC ADDRESS      | 6 bytes
+----+----+----+----+----+----+  } AP Identifier
|    WM MAC ADDRESS      | 6 bytes
+----+----+----+----+----+----+
| CC | PC | FR | HI | CH |  5 bytes
+----+----+----+----+----+----+
|    BSSID[0]    | 6 bytes
+----+----+----+----+----+----+
|S[0]|N[0]|      2 bytes
+----+----+----+----+----+----+
|    BSSID[1]    | 6 bytes
+----+----+----+----+----+----+
|S[1]|N[1]|      2 bytes
+----+----+----+----+----+----+
    :              :
    :              :
+----+----+----+----+----+----+
|    BSSID[X]    | 6 bytes
+----+----+----+----+----+----+
|S[X]|N[X]|      2 bytes
+----+----+----+----+----+----+
```

X =  PC-1
CC =  CONNECT COST (0,1,2,3 with 0 being minimum)
HI =  HEALTH INDEX (NUMBER OF UNIQUE ROOT PATHS)
FR =  FORCE REPLY
CH =  CHANNEL
PC =  PARENT COUNT (ROOT NODES SET PC TO 0)
S[i] =  Signal strength from Parent i
N[i] =  Noise from Parent i
BSSID[i] =  BSSID of Parent I
Total Size
21 + 8 * PC (MIN 21, MAX 1461)

Seek Best Parent Response

Direction  Access Server to AP
When Sent  Upon receipt of SEEK request
SNIP FUNCTION ID  14
Purpose  Topology Formation, Operation
Param 0 Value Format

```
+----+----+----+----+
| 'T'| 'M'|'C' |'P' |   4 byte signature
+----+----+----+----+----+----+
|    DS MAC ADDRESS      | 6 bytes
+----+----+----+----+----+----+  } AP Identifier
|    WM MAC ADDRESS      | 6 bytes
+----+----+----+----+----+----+
|    BSSID    | 6 bytes
+----+----+----+----+----+----+
|ENC |AUT |LTC |DLB|DCA | CH | 6 bytes
+----+----+----+----+----+----+
```

-continued

PACKET INFORMATION

```
|DT |MAH |LAS| ESL| KI |KTH|    6 bytes
+----+----+----+----+----+----+
| TO |SKL |NASL|HBI |       4 bytes
+----+----+----+----+----+----+
| PRIMARY RADIUS   | AUTPRT |  6 bytes
+----+----+----+----+----+----+
| SEC RADIUS    | ACCPRT |   6 bytes
+----+----+----+----+----+----+
|       WEP KEY 1        | 13 bytes
+----+----+----+----+----+----+
|       WEP KEY 2        | 13 bytes
+----+----+----+----+----+----+
|       WEP KEY 3        | 13 bytes
+----+----+----+----+----+----+
|       WEP KEY 4        | 13 bytes
+----+----+----+----+----+----+
|       ESSID            | ESL bytes
+----+----+----+----+----+----+
|       SHARED KEY       | SKL bytes
+----+----+----+----+----+----+
|       NAS NAME         | NASL bytes
+----+----+----+----+----+----+
```

| | |
|---|---|
| ENC = | ENCRYPTION TYPE |
| AUT = | AUTHENTICATION TYPE |
| ESL = | ESSID LENGTH |
| KI = | WEP KEY INDEX |
| SKL = | SHARED KEY LENGTH |
| NASL = | NAS ID LENGTH |
| PRIMARY RADIUS = | PRIMARY 802.1X RADIUS SERVER IP ADDRESS |
| AUTPRT = | AUTHENTICATION PORT |
| SECONDARY RADIUS = | SECONDARY 802.1X RADIUS SERVER IP ADDRESS |
| ACCPRT = | ACCOUNTING PORT |
| DLB = | DYNAMIC LOAD BALANCING |
| DCA = | DYNAMIC CHANNEL ALLOCATION |
| LTC = | LATENCY THROUGHPUT CONTROL (0 for Lowest Latency, 1 for Tradeoff) |
| MAH = | MAX ALLOWABLE HOPS |
| HBI = | HEARTBEAT INTERVAL |
| LAS = | LOCATION AWARENESS SCAN INTERVAL |
| CH = | CHANNEL NUMBER |
| DT = | DELTA T |
| KTH = | DYNAMIC LOAD BALANCING KICKIN THRESHOLD |
| TO = | LATENCY/THROUGHPUT TRADEOFF |

Channel Scan Lock Request

Direction: AP to Access Server
When Sent: Before scanning
SNIP FUNCTION ID: 15
Purpose: Health
Param 0 Value Format

```
+----+----+----+----+
|'T'| 'M'|'C' |'P' |    4 byte signature
+----+----+----+----+----+----+
|    DS MAC ADDRESS     | 6 bytes  }
+----+----+----+----+----+----+    } AP Identifier
|    WM MAC ADDRESS     | 6 bytes  }
+----+----+----+----+----+----+
```

Total Size
16 Octets

Channel Scan Lock Response

Direction: Access Server to AP
When Sent: When Access Server determines
SNIP FUNCTION ID: 16
Purpose: Health
Param 0 Value Format

```
+----+----+----+----+
|'T'| 'M'|'C' |'P' |    4 byte signature
+----+----+----+----+----+----+
|    DS MAC ADDRESS     | 6 bytes  }
+----+----+----+----+----+----+    } AP Identifier
|    WM MAC ADDRESS     | 6 bytes  }
+----+----+----+----+----+----+
```

Total Size
16 Octets

Channel Scan Release Lock Request

Direction: AP to Access Server
When Sent: After finishing scanning
SNIP FUNCTION ID: 17
Purpose: Health
Param 0 Value Format

```
+----+----+----+----+
|'T'| 'M'|'C' |'P' |    4 byte signature
+----+----+----+----+----+----+
|    DS MAC ADDRESS     | 6 bytes  }
+----+----+----+----+----+----+    } AP Identifier
|    WM MAC ADDRESS     | 6 bytes  }
+----+----+----+----+----+----+
```

Total Size
16 Octets

Channel Scan Release Lock Response

Direction: Access Server to AP
When Sent: Upon receipt of Lock Release Request
SNIP FUNCTION ID: 18
Purpose: Health
Param 0 Value Format

```
+----+----+----+----+
|'T'| 'M'|'C' |'P' |    4 byte signature
+----+----+----+----+----+----+
|    DS MAC ADDRESS     | 6 bytes  }
+----+----+----+----+----+----+    } AP Identifier
|    WM MAC ADDRESS     | 6 bytes  }
+----+----+----+----+----+----+
```

Total Size
16 Octets

Access Point Reset

Direction: Access Server to AP
When Sent: When settings change

-continued

PACKET INFORMATION

SNIP FUNCTION ID   19
Purpose            Operation
Param 0 Value Format

```
+----+----+----+----+
| T| 'M'|'C' |'P' |      4 byte signature
+----+----+----+----+----+----+
|     DS MAC ADDRESS   | 6 bytes  |
+----+----+----+----+----+----+  }  AP Identifier
|     WM MAC ADDRESS   | 6 bytes  |
+----+----+----+----+----+----+
```

Total Size
16 Octets

REFERENCES

1. Simple Network Information Protocol SNIP, Sriram Dayanandan, January 2003.

What is claimed is:

1. A wireless mesh network comprising:
an access server wherein the access server sets one or more functioning parameters of the wireless mesh network;
one or more root nodes connected to said access server and an external network;
one or more AP nodes wherein each AP node is in wireless two-way data communication with an associated parent node wherein said associated parent node is selected from all available parent nodes wherein an available parent node is another AP node within wireless communication range of the AP node and the associated parent node is an available parent node meeting one or more communication criteria or the associated parent node is a root node within wireless communication range;
wherein an AP node is in wireless communication with zero or more clients; and
wherein an AP node includes a means for switching two-way data communication from a first associated parent node to a second associated parent node based on the functioning parameters of the wireless mesh network and wherein an AP node contains one or more datasets;
wherein the communication criteria comprises instructions for the AP node to select the associated parent node wherein an available parent node is selected to become the associated parent node if the available parent node is in wireless communication with a root node or if a root node is contained in the available parent node's route path dataset;
wherein one of the datasets contained in an AP node comprises a route path dataset comprising an identifier for the associated parent node appended to the route path dataset for the associated parent node; and
wherein one of the datasets contained in the AP node comprises an amount of AP data traffic wherein the amount of AP data traffic comprises the amount of data exchanged between the AP node and the zero or more clients in communication with the node and wherein another of the datasets contained in the AP node comprises a maximum capacity amount of the AP node.

2. The wireless mesh network of claim 1 wherein one of the datasets contained in the AP node comprises a cost to connect and said cost to connect is calculated using the level of network congestion experienced by the available parent node.

3. The wireless mesh network of claim 1 wherein the communication criteria comprises instructions for the AP node to select the associated parent node wherein the cost to connect of the associated parent is the lowest of all available parent nodes.

4. The wireless mesh network of claim 1 wherein the communication criteria comprises instructions for the AP node to associate with an available parent node wherein the amount of AP data traffic is less than the sum of the maximum capacity amount of the available parent node and the available parent amount of AP data traffic.

5. The wireless mesh network of claim 4 wherein the communication criteria comprises instructions for the AP node to associate with a single suitable parent node wherein a parent node is suitable if the throughput capacity of the parent node is the highest of all available parent nodes.

6. The wireless mesh network of claim 1 wherein one of the datasets contained in an AP node comprises a throughput capacity of the AP node.

7. The wireless mesh network of claim 1 wherein the means for switching two-way data communications selects the second associated parent node when the first associated parent node amount of AP data traffic approaches the parent node maximum capacity amount within a congestion value set by the access server.

8. The wireless mesh network of claim 1 wherein the wireless communication with clients includes a means to adjust a signal strength of the AP node wireless communication with clients and wherein the means for adjusting the signal strength of the AP node decreases the signal strength of the AP node when the amount of data sent from the zero or more clients exceeds a data congestion threshold value.

9. A wireless mesh network comprising:
an access server wherein the access server sets one or more functioning parameters of the wireless mesh network;
one or more root nodes connected to said access server and an external network;
one or more AP nodes wherein each AP node is in wireless two-way data communication with an associated parent node wherein said associated parent node is selected from all available parent nodes wherein an available parent node is another AP node within wireless communication range of the AP node and the associated parent node is an available parent node meeting one or more communication criteria or the associated parent node is a root node within wireless communication range;
wherein an AP node is in wireless communication with zero or more clients; and
wherein an AP node includes a means for switching two-way data communication from a first associated parent node to a second associated parent node based on the functioning parameters of the wireless mesh network and wherein an AP node contains one or more datasets
wherein one of the datasets contained in an AP node comprises a route path dataset comprising an identifier for the associated parent node appended to the route path dataset for the associated parent node
wherein the communication criteria comprises instructions for the AP node to select the associated parent node wherein an available parent node is selected to become the associated parent node if the available parent node is in wireless communication with a root node or if a root node is contained in the available parent node's route path dataset; and wherein one of the datasets contained in an AP node comprises a dataset of child node identifiers wherein the dataset of child node identifiers is a dataset identifying each AP node in wireless communication with the AP.

10. The wireless mesh network of claim 9 wherein the dataset of child node identifiers is accessible to each child node.

11. The wireless mesh network of claim 10 wherein the AP node dataset of child nodes contains two or more child nodes wherein the zero or more clients in communication with a first child node sends data wherein a destination of the data is a second child node, the first child node sends the data directly to the second child node.

12. A wireless mesh network comprising:

an access server wherein the access server sets one or more functioning parameters of the wireless mesh network;

one or more root nodes connected to said access server and an external network;

one or more AP nodes wherein each AP node is in wireless two-way data communication with an associated parent node wherein said associated parent node is selected from all available parent nodes wherein an available parent node is another AP node within wireless communication range of the AP node and the associated parent node is an available parent node meeting one or more communication criteria or the associated parent node is a root node within wireless communication range;

wherein an AP node is in wireless communication with zero or more clients; and wherein an AP node includes a means for switching two-way data communication from a first associated parent node to a second associated parent node based on the functioning parameters of the wireless mesh network and wherein an AP node contains one or more datasets wherein one of the datasets contained in an AP node comprises a route path dataset comprising an identifier for the associated parent node appended to the route path dataset for the associated parent node wherein the communication criteria comprises instructions for the AP node to select the associated parent node wherein an available parent node is selected to become the associated parent node if the available parent node is in wireless communication with a root node or if a root node is contained in the available parent node's route path dataset; and wherein the communication criteria further comprises instructions for the AP node to associate with a single suitable parent node wherein the route path dataset of the parent node is the shortest route path dataset of all available parent nodes.

13. A wireless mesh network comprising:

an access server wherein the access server sets one or more functioning parameters of the wireless mesh network;

one or more root nodes connected to said access server and an external network;

one or more AP nodes wherein each AP node is in wireless two-way data communication with an associated parent node wherein said associated parent node is selected from all available parent nodes wherein an available parent node is another AP node within wireless communication range of the AP node and the associated parent node is an available parent node meeting one or more communication criteria or the associated parent node is a root node within wireless communication range;

wherein an AP node is in wireless communication with zero or more clients; and wherein an AP node includes a means for switching two-way data communication from a first associated parent node to a second associated parent node based on the functioning parameters of the wireless mesh network and wherein an AP node contains one or more datasets wherein one of the datasets contained in an AP node comprises a route path dataset comprising an identifier for the associated parent node appended to the route path dataset for the associated parent node wherein the communication criteria comprises instructions for the AP node to select the associated parent node wherein an available parent node is selected to become the associated parent node if the available parent node is in wireless communication with a root node or if a root node is contained in the available parent node's route path dataset; and wherein the access server functioning parameters includes a latency modifier wherein the AP node means for switching from the first associated parent node to a second associated parent node result in selection of the second associated parent wherein the route path of the second associated parent node is shorter than the first associated route path by a value related to the latency modifier.

* * * * *